United States Patent [19]
Inoue et al.

[11] Patent Number: 5,957,377
[45] Date of Patent: Sep. 28, 1999

[54] FLOW CONTROL VALVE AND HOT-WATER TYPE HEATER APPARATUS EMPLOYING THE SAME

[75] Inventors: Yoshimitsu Inoue, Toyoake; Koichi Ito; Shinji Aoki, both of Kariya; Hiroshi Nonoyama, Toyota; Hikaru Sugi, Nagoya; Yoshihiko Okumura, Kariya, all of Japan

[73] Assignee: Nippondenso Co., Ltd., Kariya, Japan

[21] Appl. No.: 08/940,990

[22] Filed: Sep. 30, 1997

Related U.S. Application Data

[63] Continuation of application No. 08/578,937, Dec. 27, 1995, abandoned, which is a continuation-in-part of application No. 08/491,219, Jun. 16, 1995, abandoned.

[30] Foreign Application Priority Data

| Jun. 17, 1994 | [JP] | Japan | 6-135282 |
| Jul. 8, 1994 | [JP] | Japan | 6-156923 |
| Dec. 27, 1994 | [JP] | Japan | 6-324960 |
| Mar. 14, 1995 | [JP] | Japan | 7-054109 |

[51] Int. Cl.$^6$ ..................................................... B60H 1/06
[52] U.S. Cl. ............................. 237/12.3 B; 137/625.32; 165/297
[58] Field of Search ............................. 237/8 C, 12.3 B; 137/625.32; 165/297, 299

[56] References Cited

U.S. PATENT DOCUMENTS

| 2,749,050 | 6/1956 | Booth | 165/297 |
| 2,889,116 | 6/1959 | MacCracken | 237/8 C |
| 3,398,891 | 8/1968 | Horne | 165/297 |
| 3,896,029 | 7/1975 | Beuselinck | 137/625.32 |
| 3,966,119 | 6/1976 | Harter et al. . | |
| 4,949,779 | 8/1990 | Kenny et al. . | |
| 4,993,231 | 2/1991 | Torrence et al. . | |
| 5,085,267 | 2/1992 | Torrence . | |
| 5,127,576 | 7/1992 | Weatherhead et al. . | |
| 5,152,151 | 10/1992 | Jarosch . | |
| 5,181,656 | 1/1993 | Schwerdt | 237/8 C |
| 5,216,892 | 6/1993 | Jarosch et al. . | |
| 5,226,595 | 7/1993 | Devera et al. . | |
| 5,273,105 | 12/1993 | Higashihara et al. | 165/297 |
| 5,556,027 | 9/1996 | Fiedrich | 237/85 |

FOREIGN PATENT DOCUMENTS

| 409816 | 11/1909 | France | 237/12.3 B |
| 2176243 | 10/1973 | France . | |
| 2271470 | 12/1975 | France . | |
| A-1775096 | 1/1972 | Germany . | |
| 1775096 | 1/1972 | Germany . | |
| 1-145472 | 6/1989 | Japan . | |
| 637051 | 5/1950 | United Kingdom | 237/8 C |

*Primary Examiner*—William E. Tapolcai
*Attorney, Agent, or Firm*—Pillsbury Madison & Sutro LLP

[57] ABSTRACT

To be able to control minute flow in a heat exchanger flow control valve without requiring a minute opening portion, an opening surface area of a hot-water inlet pipe into which hot water flows from an engine is restricted by a first restricting portion of a control passage provided in a needle valve of a flow control valve, and along with this, an opening surface area of a hot-water outlet pipe connected to an inlet side of a heat exchanger for heater use is restricted by a second restricting portion of a control passage formed in the needle valve, and a middle portion of these two control passages is constantly connected to a bypass circuit by a third restricting portion. Pressure of the middle portion thereof can thereby be lowered, pressure applied to the heat exchanger can be adequately reduced, and for this reason minute flow through the valve can be controlled even without establishing a minute opening portion using the needle valves Also, change in heat-exchanger hot-water flow can be reduced by structuring the first and second restricting portions in a configuration whereby flow constant is reduced as amount of flow increases and, along with this, structuring the third restricting portion in a configuration whereby flow constant is maintained substantially uniformly even if amount of flow increases.

42 Claims, 30 Drawing Sheets

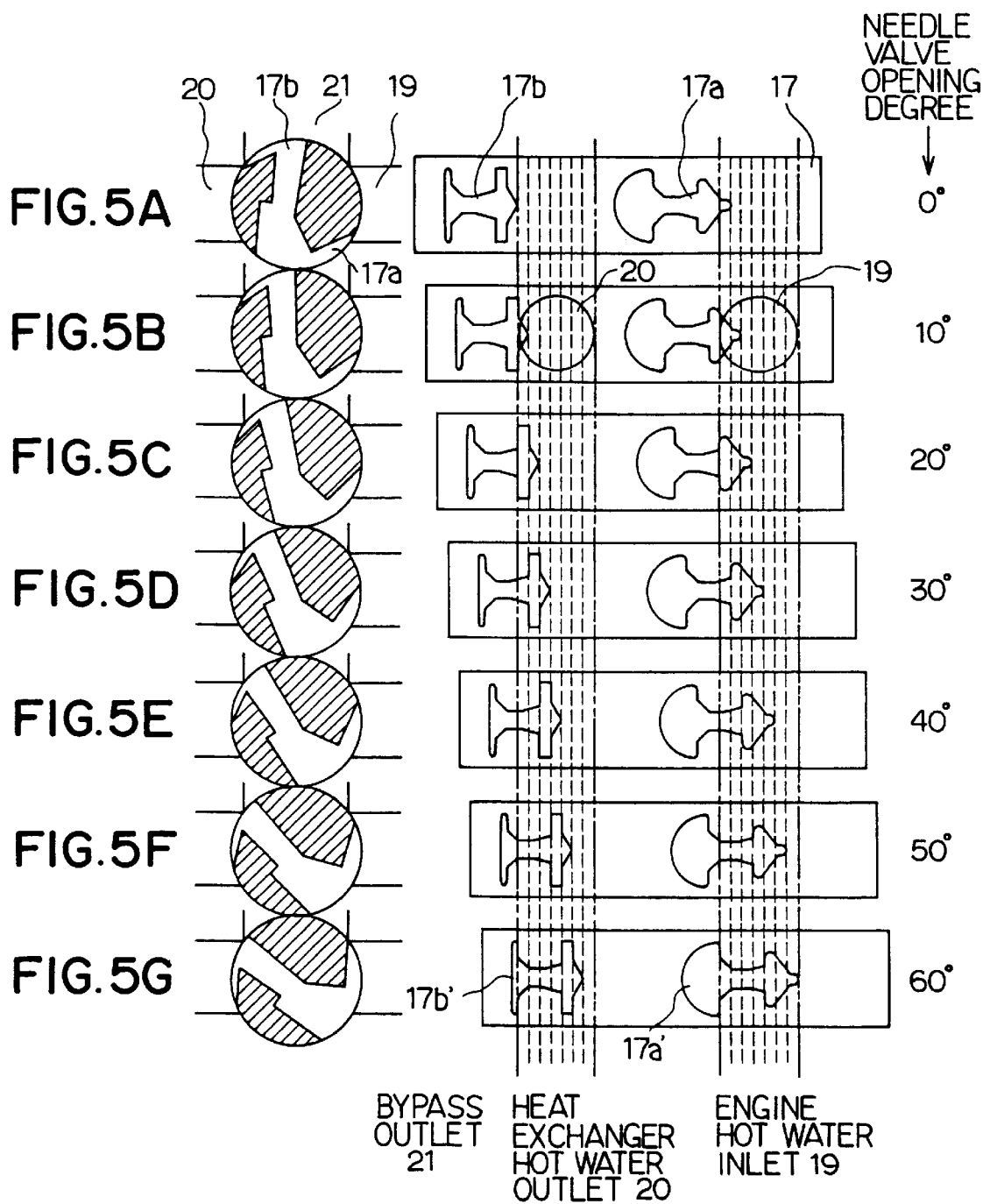

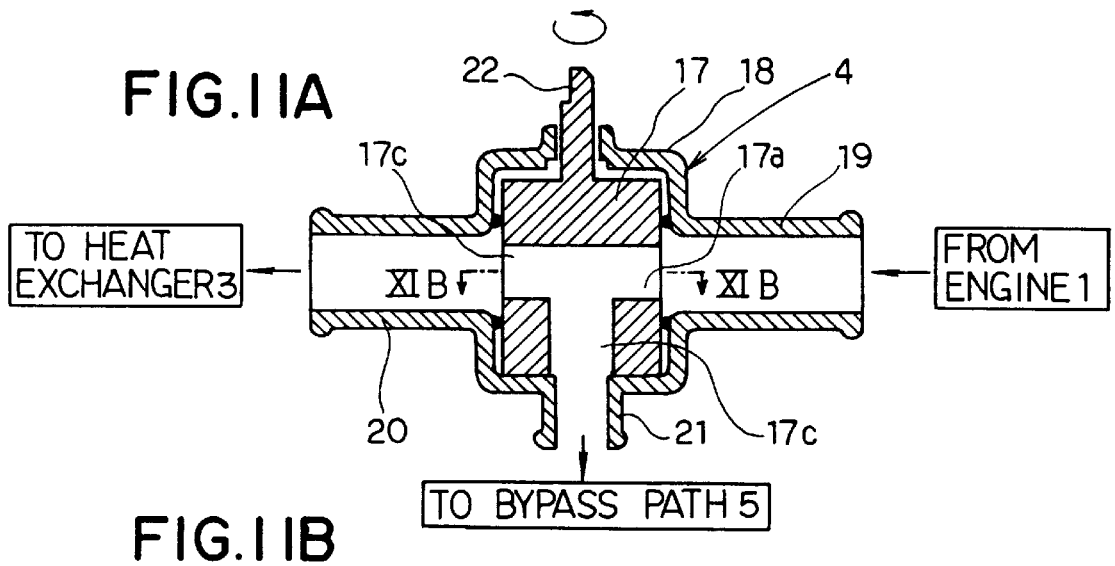
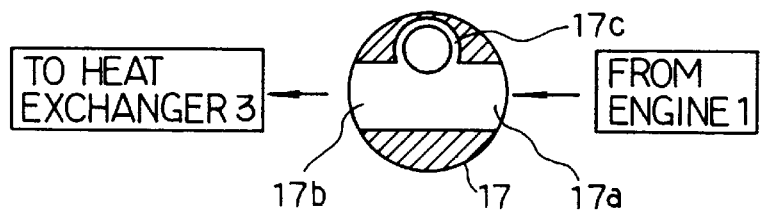
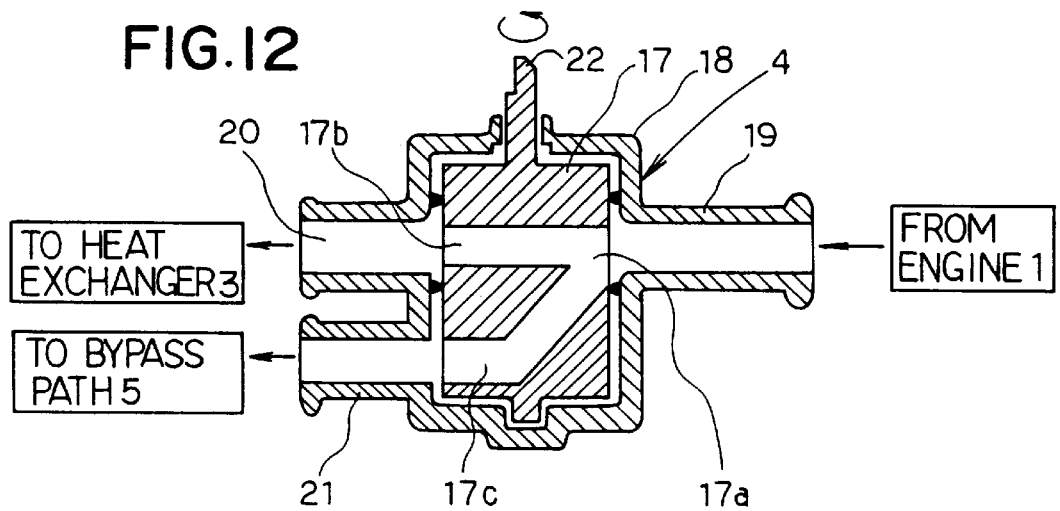

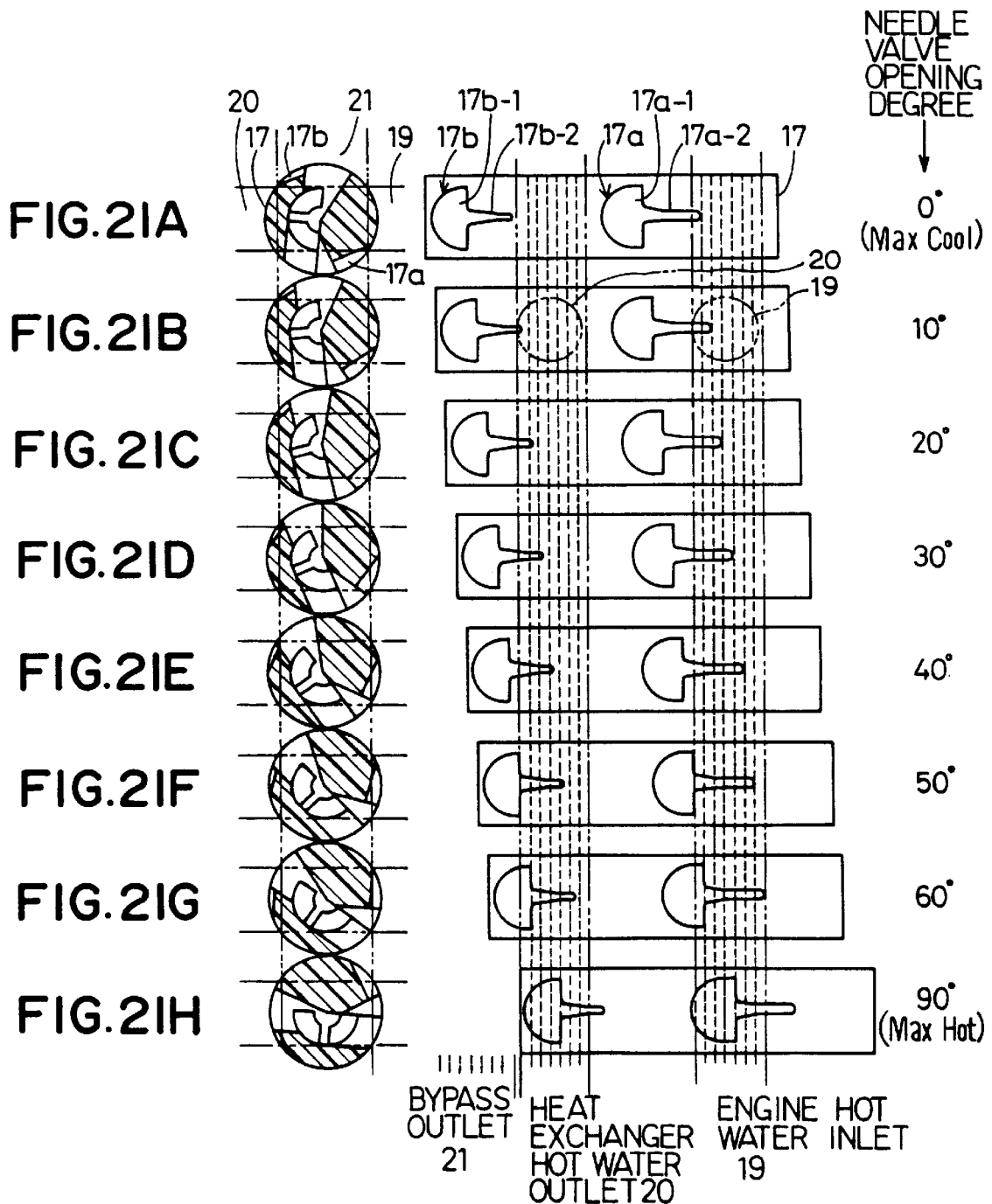

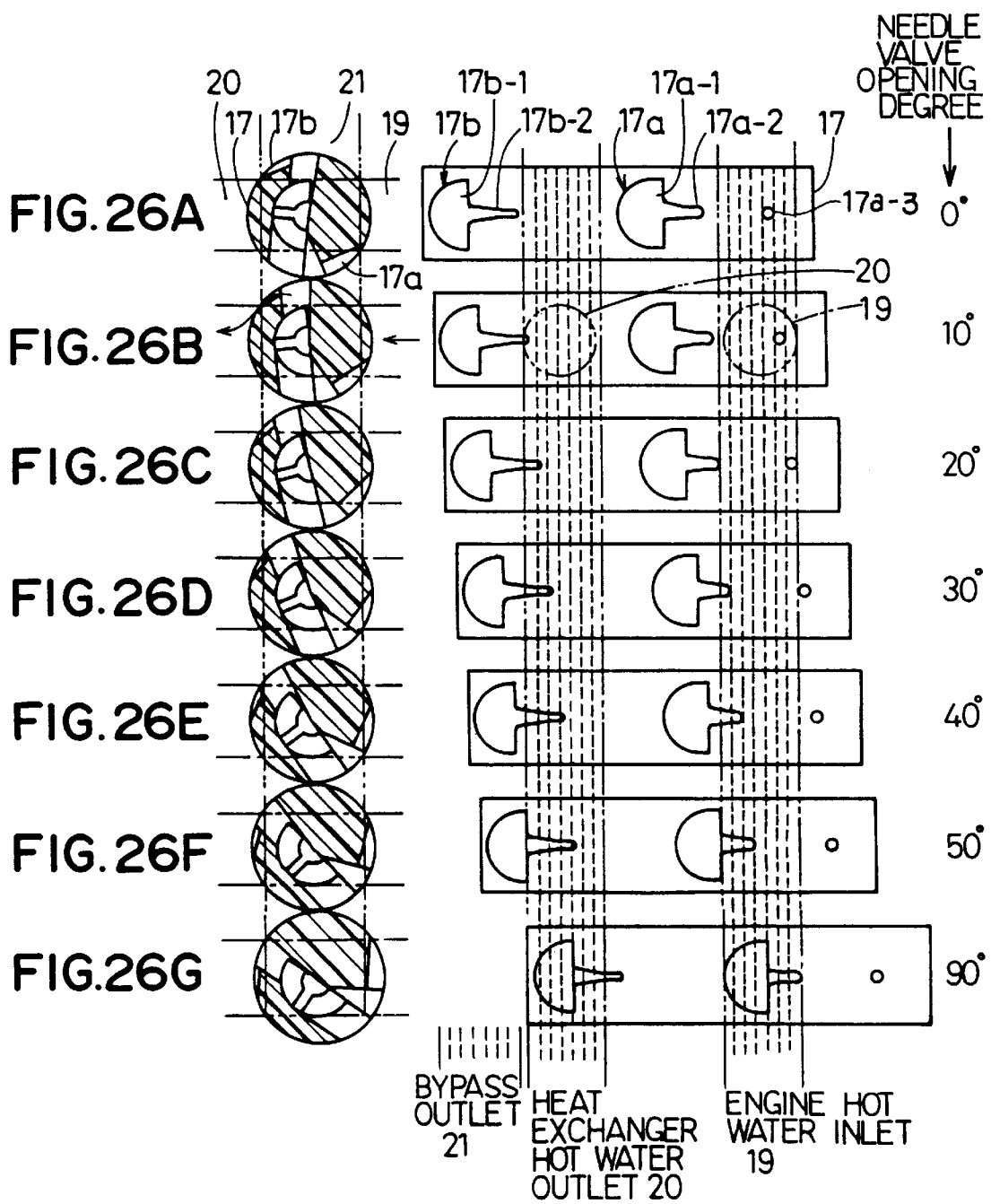

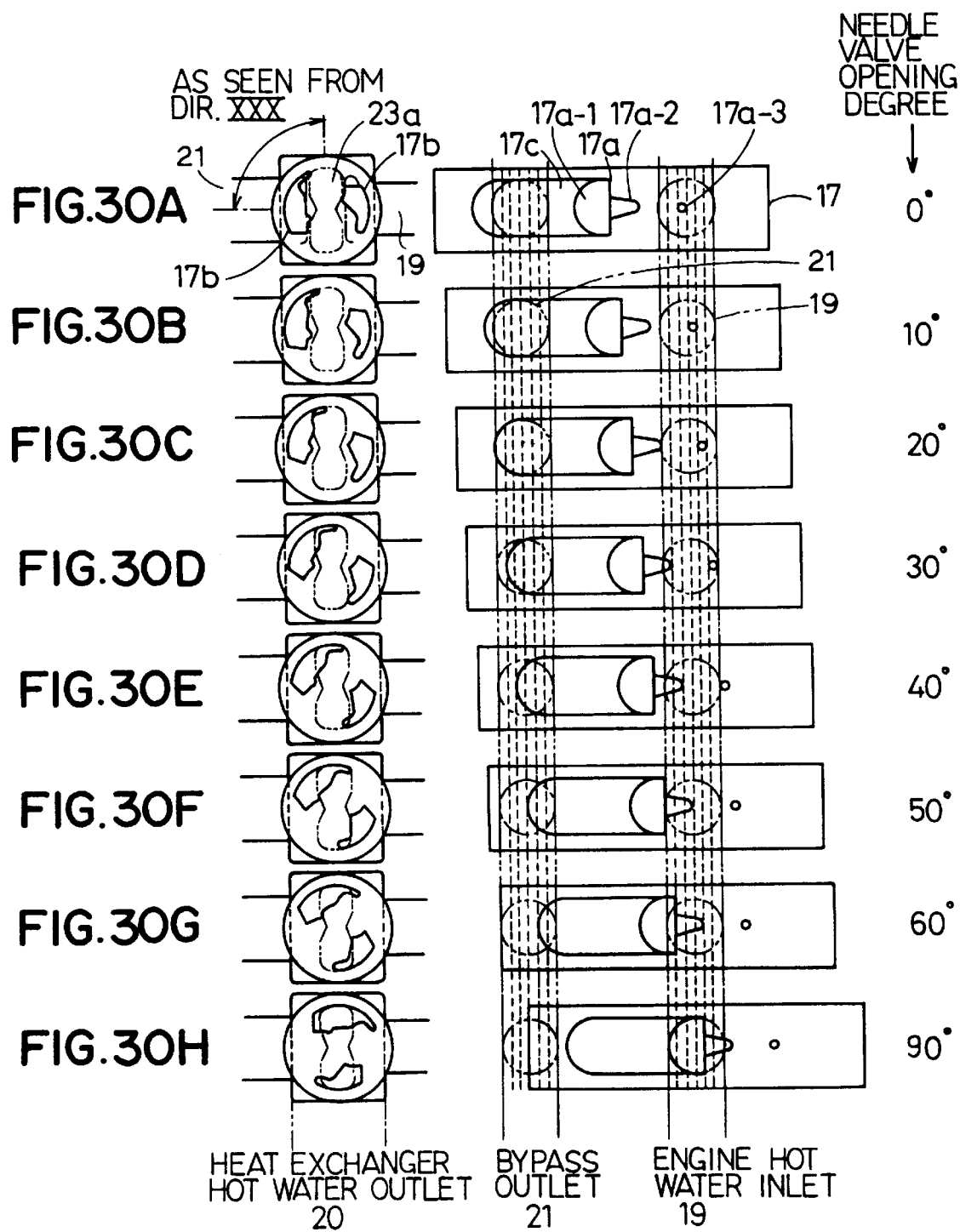

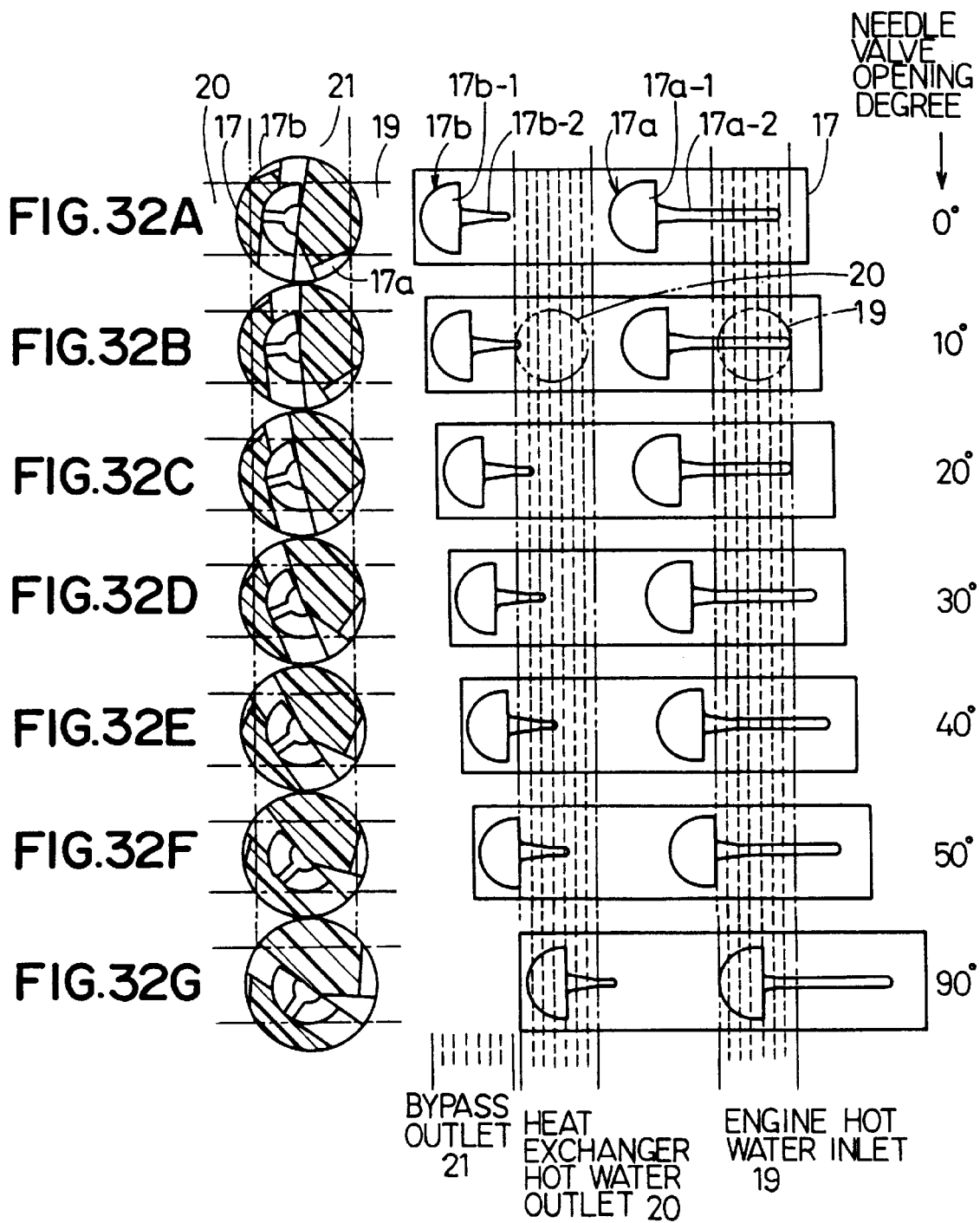

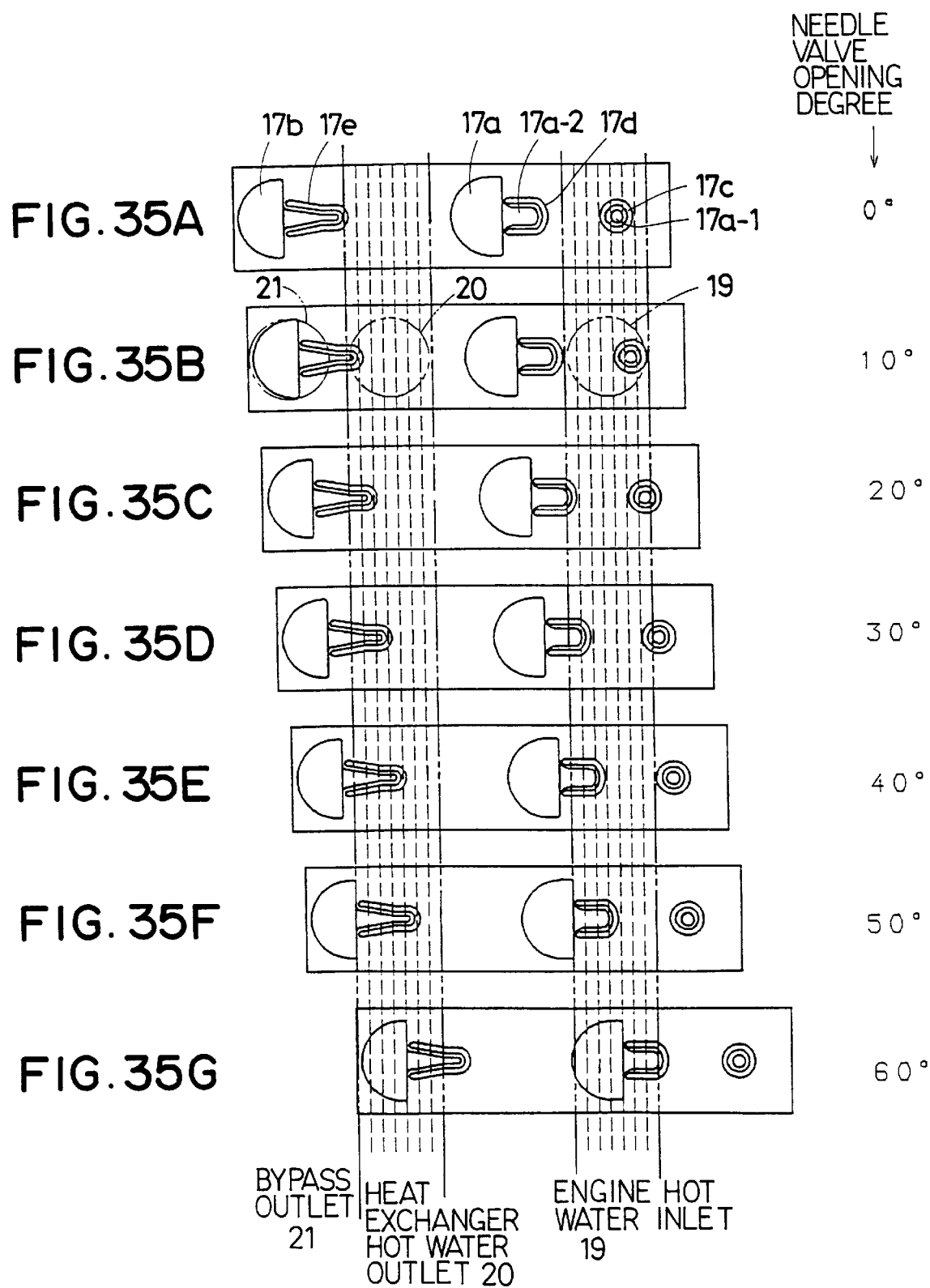

FLOW CONTROL VALVE AND HOT-WATER TYPE HEATER APPARATUS EMPLOYING THE SAME

CROSS-REFERENCE TO RELATED APPLICATIONS

This application is a continuation of U.S. application Ser. No. 08/578,937, filed Dec. 27, 1995, now abandoned, which was a continuation-in-part of U.S. application Ser. No. 08/491,219, filed Jun. 16, 1995, now abandoned and claims priority from Japanese Patent Application Nos. Hei. 6-324960 and Hei. 7-54109, incorporated herein by reference. It is related to those applications and Japanese Patent Application Nos. Hei. 6-135282 and Hei. 6-156923, also incorporated herein by reference.

BACKGROUND OF THE INVENTION

1. Field of the Invention

The present invention relates to a flow control valve to control hot water flow and a hot-water type heater apparatus employing the same, and particularly to such devices employed in a hot-water type heater apparatus for automotive use.

2. Description of Related Art

As a method of controlling the temperature of blown air of an automotive air-conditioning apparatus including a hot-water type heater apparatus, the technique of controlling hot water flow to a heat exchanger for heater use and of controlling a blown air temperature is known. This hot water flow control method has the following advantages in comparison with an air-mix method of controlling a blown air temperature which controls a mixing ratio of chilled air and warmed air by an air-mix damper.

With the hot-water flow control method, space for mixing chilled air and warmed air is not required, and so the volume of the air-duct system can be decreased by a corresponding amount, and there are also other advantages such as the ability to alleviate air resistance by eliminating the mixing space and the ability to reduce blower electrical power and wind noise.

Japanese Patent Application Laid-Open No. Sho. 64-145472 discloses a control valve for controlling hot-water flow by the foregoing hot-water flow control method. This device includes a hot water inlet into which hot water flows from an engine, a hot-water outlet through which hot water flows out toward a heat exchanger for heater use, and a bypass outlet through which hot water to flows out toward a bypass circuit of the heat exchanger for heater use in a hot water flow control valve housing.

Accordingly, a tubular needle valve to control hot water flow to the hot water outlet and the bypass outlet is disposed rotatably within the valve housing, and along with this, a pressure-responsive valve which is opened by a rise in hot water pressure is provided in the bypass circuit. When engine speed rises and hot water pressure rises, the pressure-responsive valve opens and hot water flows into the bypass circuit side as well, by which an excessive increase in hot water flow to the hot water outlet is prevented.

In this way, occurrence of unpleasant flow noise in the passage restricting portion of the needle valve portion is prevented by preventing an excessive increase of hot water flow to the hot water outlet.

A hot-water type heater apparatus has a characteristic of a sudden rise in blown-air temperature in a minute-flow region of hot water, as is known from the heat-radiating characteristics of a heat exchanger for heater use, and so if the minute-flow region of hot water is not controlled with accuracy, it becomes impossible to control blow-air temperature as desired, producing a fatal defect in practical use.

Nevertheless, the foregoing prior art device only controls an opening surface area of a hot-water outlet simply using a needle valve, and so in order to control minute flow it becomes necessary to form an opening portion of minute surface area in a portion of the control passages formed in the needle valve.

However, this minute opening portion is not only difficult to machine, but foreign matter such as casting sand contained in the hot water may clog the minute opening portion during minute flow control, thereby producing a state wherein minute flow cannot be controlled. Additionally, because hot water flow at the minute opening portion is restricted suddenly, the differential pressure between the areas before and after the minute opening portion becomes large, and there is also a problem of increased production of flow noise.

SUMMARY OF THE INVENTION

In light of the foregoing problems, it is an object of the present invention to provide superior control of minute hot water flow in a needle valve without formation of a minute opening portion.

The present invention employs the following technical measures to achieve the foregoing objects.

A first aspect of the invention provides a flow control valve to control hot-water flow supplied from a hot-water supply source to a heat exchanger for heater use, comprising a valve -housing; a hot-water inlet disposed on this valve housing and communicating with a hot-water discharge side of the hot-water supply source or a hot-water outlet side of the heat exchanger for heater use; a hot-water outlet disposed on the valve housing and communicating with a hot-water inlet side of the heat exchanger or a hot-water intake side of the hot-water supply source; an opening for bypass use disposed on the valve housing and communicating with an inlet side or an outlet side of a bypass circuit of the heat exchanger; a needle valve installed within the valve housing capable of regulating an opening surface area of the hot-water inlet, the hot-water outlet, and the opening for bypass use; and a needle-valve operating device to operate this needle valve; wherein the needle valve is structured to, at one end of an operating range thereof, restrict an opening surface area of the hot water inlet and the hot-water outlet both to a small area, and also to open the opening for bypass use with an opening area which is sufficiently larger than the small area with respect to a hot water passage between the hot water inlet and the hot water outlet; and further, the needle valve is structured so that as operating flow of the needle valve increases from one end of an operating range thereof to another end, an opening surface area of the hot water inlet and the hot water outlet both enlarge, and also the opening for bypass use with an opening area gradually diminishes with respect to a hot water passage between the hot water inlet and the hot water outlet.

A second aspect of the present invention provides a hot-water heater apparatus comprising a hot-water supply source; a heat exchanger for heater use to exchange heat between hot water supplied from this hot water supply source and air to perform heating of a room interior; a flow control valve to control hot water flow supplied from the hot water supply source to the heat exchanger; and a bypass circuit bypassing the heat exchanger, the flow control valve further comprising a valve housing; a hot-water inlet disposed on this valve housing and communicating with a hot water discharge side of the hot water supply source or a hot water outlet side of the heat exchanger for heater use; a hot-water outlet disposed on the valve housing and communicating with a hot water inlet side of the heat exchanger or a hot water intake side of the hot water supply source; an opening for bypass use disposed on the valve housing and communicating with an inlet side or an outlet side of the bypass circuit of the heat exchanger; a needle valve installed within the valve housing capable of regulating an opening area of the hot-water inlet, the hot-water outlet, and the opening for bypass use; and a device for operating the needle-valve to operate this needle valve, wherein the needle valve is structured to, at one end of an operating range thereof, restrict an opening surface area of the hot water inlet and the hot water outlet both to a small area, and also to open the opening for bypass use with an opening area which is sufficiently larger than the small area with respect to a hot water passage between the hot water inlet and the hot water outlet; and further the needle valve is structured so that as operating flow of the needle valve increases from one end of an operating range thereof to another end, an opening area of the hot water inlet and the hot water outlet both enlarge, and also the opening for bypass use with an opening area gradually diminishes with respect to a hot water passage between the hot water inlet and the hot water outlet.

A third aspect of the invention provides a hot-water heater apparatus employed in an automobile having a water-cooled engine, comprising a heat exchanger for heater use to exchange heat between hot water supplied from the engine and air to perform heating of a passenger compartment interior; a flow control valve to control hot-water flow supplied from the engine to the heat exchanger; and a bypass circuit to cause hot water to flow, bypassing the heat exchanger; the flow control valve further comprising a valve housing; a hot-water inlet disposed on this valve housing and communicating with a hot-water discharge side of the engine or hot-water outlet side of the heat exchanger for heater use; a hot-water outlet disposed on the valve housing and communicating with a hot water inlet side of the heat exchanger or a hot water intake side of the engine; an opening for bypass use disposed on the valve housing communicating hot water flowing in from the hot water inlet with an inlet side or an outlet side of the bypass circuit; a needle valve installed within the valve housing capable of regulating an opening surface area of the hot water inlet, the hot water outlet, and the opening for bypass use; and a device for operating the needle valve operating, wherein the needle valve is structured to, at one end of an operating range thereof, restrict an opening area of the hot water inlet and the hot water outlet both to a small surface area, and also to open the opening for bypass use with an opening area which is sufficiently larger than the small area with respect to a hot water passage between the hot water inlet and the hot water outlet; and further the needle valve is structured so that an operating amount of the needle valve increases from one end of an operating range thereof toward another end, an opening area of the hot water inlet and the hot water outlet both enlarge, and also the opening for bypass use with an opening area gradually diminishes with respect to a hot water passage between the hot water inlet and the hot water outlet.

According to another aspect of the invention, the bypass circuit is provided with a pressure-responsive valve which is opened by a rise in hot-water pressure.

Thus, a pressure-responsive valve which is opened by a rise in hot-water pressure is provided in the bypass circuit, and so even if hot water supply pressure of a hot water supply source fluctuates, the hot water pressure applied to the heat exchanger is maintained uniformly, and it is easily possible to suppress fluctuation in blown-air temperature.

According to a further aspect of the present invention, the needle valve is structured as a rotor disposed rotatably within the valve housing to regulate an opening area of the hot water inlet, the hot water outlet, and the opening for bypass use by rotation of the needle valve.

According to another aspect of the present invention, the needle valve is disposed reciprocatably within the valve housing and regulates an opening area of the hot water inlet, the hot water outlet, and the opening for bypass use by reciprocation of the needle valve.

According to a still further aspect of the present invention, control passages are formed in the needle valve to regulate an opening surface area of the hot water inlet, the hot water outlet, and the opening for bypass use.

Preferably, the needle valve control passages are structured so that hot water flows through the opening for bypass use even at an operating position of a non-heater mode which interrupts hot-water flow to the heat exchanger.

Thus, control passages of the needle valve are structured so that hot water flows through the opening for bypass use even at an operating position of a non-heater mode which interrupts hot-water flow to the heat exchanger, and so foreign matter such as casting sand or the like can be washed away by this hot water flow, and the effect of preventing obstruction of the valve passages due to foreign matter such as casting sand or the like can be further heightened.

According to a still further aspect of the present invention, a second bypass circuit which is not controlled by the flow control valve is disposed on a hot-water upstream side from the bypass circuit controlled by the flow control valve.

Preferably, the second bypass circuit has pressure-responsive valves which are opened by a rise in hot water pressure.

Further, the bypass circuit controlled by the flow control valve and the second bypass circuit preferably are both provided with pressure-responsive valves which are opened by a rise in hot water pressure.

According to another aspect of the present invention, the needle valve control passages form a first restricting portion to restrict an opening surface area of the hot water inlet and a second restricting portion to restrict an opening surface area of the hot water outlet in a predetermined mutual relationship with the first restricting portion.

According to still another aspect of the present invention, the bypass circuit has a first bypass circuit with a pressure-responsive valve which is opened by a rise in hot-water pressure and a second bypass circuit provided in parallel with this first bypass circuit and which is normally open.

Thus, hot-water pressure applied to the heat exchanger for heater use is maintained uniformly by the mode of operation of the pressure-responsive valve even if hot water supply pressure of a hot-water supply source fluctuates, and fluctuation in blown-air temperature can be suppressed and along with this, hot water continues to flow through a second bypass circuit which is normally open to a bypass circuit even when the pressure-responsive valve has closed, and so control of minute flow to the heat exchanger for heater use is facilitated and control characteristics of blown-air temperature can be made even more easily.

According to another aspect of the present invention, the pressure-responsive valve has housings having an inlet and an outlet for hot water, a valve seat formed on an inner-wall surface of these housing, a needle valve to regulate a passage degree of opening of the valve seat in accordance with hot water pressure, and devices for bypass passage which normally communicate between the inlet and the outlet, bypassing the valve seat and the needle valve.

Thus, devices for bypass passage are incorporated within the pressure-responsive valve itself, and so the structure of the hot-water type heater apparatus can be further simplified and its cost can be reduced.

According to a still further aspect of the present invention, the first restricting portion is structured so that an opening area with the hot-water inlet is substantially uniform when an operating amount of the needle valve increases by a predetermined amount from one end of an operating range thereof toward another end and thereafter an opening area with the hot-water inlet increases as the needle valve operating amount increases, whereas the second restricting portion is structured so that the needle valve is open to the hot water outlet when there has been a minute amount of operation from one end of the operating range, and along with increase of the needle valve operating amount thereafter, an opening area with the hot water outlet increases.

Thus, in the control passages of the needle valve a first restricting portion to restrict an opening surface area of the hot water type inlet and a second restricting portion to restrict an opening surface area of the hot water outlet are formed in a predetermined mutual relationship with the first restricting portion; in particular the first restricting portion is such that an opening area with the hot-water inlet is substantially uniform while an operating amount of the needle valve increases by a predetermined amount from one end of an operating range thereof toward another end and thereafter an opening surface area with the hot water inlet increases as the needle valve operating amount increases as the needle valve operating amount increases, and so characteristics whereby the blown-air temperature is easily controlled can be obtained wherein an increase in hot water flowing into the heat exchanger during initial operation of the needle valve is suppressed, and the slope of control characteristics of blown-air temperature in a comparatively low-temperature range is flattened.

Preferably, when the needle valve has been operated in a position of another end of the operating range, an opening surface area of the first restricting portion and the hot-water inlet and an opening surface area of the second restricting portion and the hot-water outlet reach a maximum, and further the valve is structured so that an interval between the control passages having the first and second restricting portions and the opening for bypass use is obstructed.

Thus, when the needle valve has been set to a position of another end of the operating range (i.e., the maximum heating position), an opening surface area of the first restricting portion and the hot water inlet and an opening surface area of the second restricting portion and the hot water outlet reach a maximum, and further an interval between the control passages having these first and second restricting portions and the opening for bypass use is obstructed, and so hot water flow to the bypass circuit is prevented and hot water of maximum flow can be caused to flow the heat exchanger with a maximum surface opening area, and maximum heating capacity can be assured.

Because various embodiments of the present invention have the above-described features in a state where a needle valve has been operated at one end of an operating range thereof, an opening area of a hot water inlet and a hot water outlet are both restricted to a small area, and also an opening for bypass use is opened to a large opening area with respect to a hot-water passage between the hot-water inlet and the hot-water outlet, and further as an operating amount of the needle valve increases from one end of an operating range thereof toward another end, an opening area of the hot-water inlet and the hot-water outlet both enlarge, and also the opening for bypass use with an opening area gradually diminishes with respect to the hot water passage between the hot water inlet and the hot water outlet.

Consequently, to reduce a blown-air temperature of a heat exchanger, when minutely controlling hot water flow to the heat exchanger, the opening areas of the hot water inlet and hot water outlet are both restricted to a small area (i.e., a two-stage restriction), and moreover the intermediate portion of the hot water inlet and hot outlet communicates with a bypass circuit, and thereby the hot water pressure applied to the heat exchanger for heater use can be made sufficiently small.

As a result of this, favorable control of minutes flow is possible with no formation of a minute opening portion in the needle valve, and so obstruction of the valve passage due to foreign matter such as casting sand can reliably be prevented, and along with this, it is easily possible to effectively control blown-air temperature of the heat exchanger for heater use from a low-temperature range to a high-temperature range is large.

BRIEF DESCRIPTION OF THE DRAWINGS

Other objects, features and characteristics of the present invention will be appreciated from a study of the following detailed description, the appended claims, and drawings, all of which form a part of this application. In the drawings:

FIGS. 5A–5G are cross-sectional views and development diagrams of an individual needle valve (rotor) of a flow control valve according to the present invention;

FIGS. 11A and 11B are cross-sectional views showing a second embodiment of a flow control valve according to the present invention; FIG. 11B being a cross-sectional view taken along line XIB—XIB of FIG. 11A;

FIG. 12 is a cross-sectional view showing a third embodiment of a flow control valve according to the present invention;

FIGS. 21A–21H are cross-sectional views taken along line XXB—XXB of FIG. 20A and development diagrams of the needle valve of the flow control valve according to the fourteenth embodiment;

FIGS. 26A–26G are cross-sectional views taken along line XXVI—XXVI of FIG. 25A, indicating the needle valve of the flow control valve according to the fifteenth embodiment, and development diagrams of the needle valve of the flow control valve according to that embodiment;

FIGS. 30A–30H are cross-sectional views taken along line XXX—XXX of FIG. 29A indicating the needle valve of the flow control valve according to the sixteenth embodiment and development diagrams of the needle valve of the flow control valve according to that embodiment;

FIGS. 32A and 32B are cross-sectional views taken along line XXXIII—XXXIII of FIG. 31A showing the needle valve of the flow control valve according to the seventeenth embodiment and development diagrams of the needle valve of the flow control valve according to that embodiment;

FIG. 34A is a top view of the needle valve alone, FIG. 34B is a front view of the needle valve alone, and FIG. 34C is a sectional view taken along line XXXIVC—XXXIVC of FIG. 34B;

FIGS. 35A–35G are development diagrams of the needle valve rotor shown in FIGS. 34A–34C;

DETAILED DESCRIPTION OF THE PREFERRED EMBODIMENTS

Figure 1:
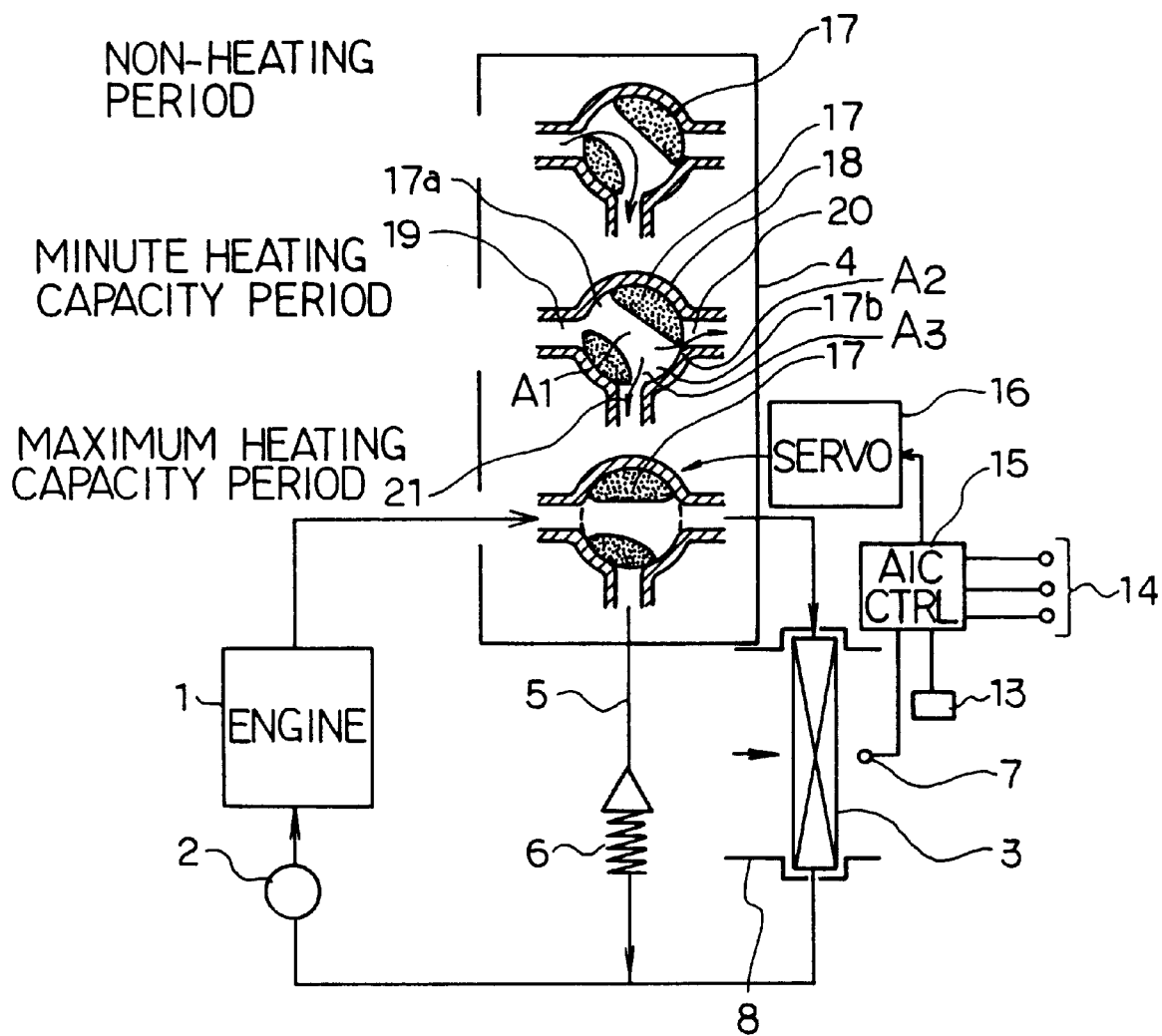
FIG. 1 is a hot-water circuit diagram showing a first embodiment according to the present invention.

Embodiments according to the present invention will be described hereinafter with reference to the drawings.

FIGS. 1 to 10 indicate a first embodiment according to the present invention, and indicate an application of the present invention in a hot-water type heater apparatus of an air-conditioning device for automotive use. Reference numeral 1 denotes a water-cooled type engine for automotive use and numeral 2 denotes a water pump driven by the engine 1 to circulate water in a coolant water circuit (hot water circuit) of the engine 1. Reference numeral 3 denotes a heat exchanger for use as a heater core to exchange heat between hot water supplied from the engine and blown air to thereby heat the blown air and numeral 4 denotes a flow control valve according to the present invention, being a three-way type flow control valve having three hot-water inlets/outlets. The structure thereof will be described in detail later.

Reference numeral 5 denotes a bypass path disposed in parallel with the heat exchanger 3, and numeral 6 denotes a constant-differential pressure valve or pressure-responsive valve which opens when the differential pressure between its sides reaches a previously established specified value, and which functions to make the inlet and outlet pressures of the heat exchanger 3 substantially equal even if the discharge pressure of the water pump 2 fluctuates due to speed fluctuation of the engine 1.

Reference numeral 7 denotes a temperature sensor installed within an air duct or heater case 8 of an automatic air-conditioning apparatus in which the heat exchanger 3 is installed (see also FIG. 2) on an air downstream side of the heat exchanger 3 and at a location immediately before a branch point of various vents 9 to 12 which lead to a passenger compartment. This temperature sensor 7 is composed of a thermistor and detects the temperature of air blown into the passenger compartment.

Figure 2:
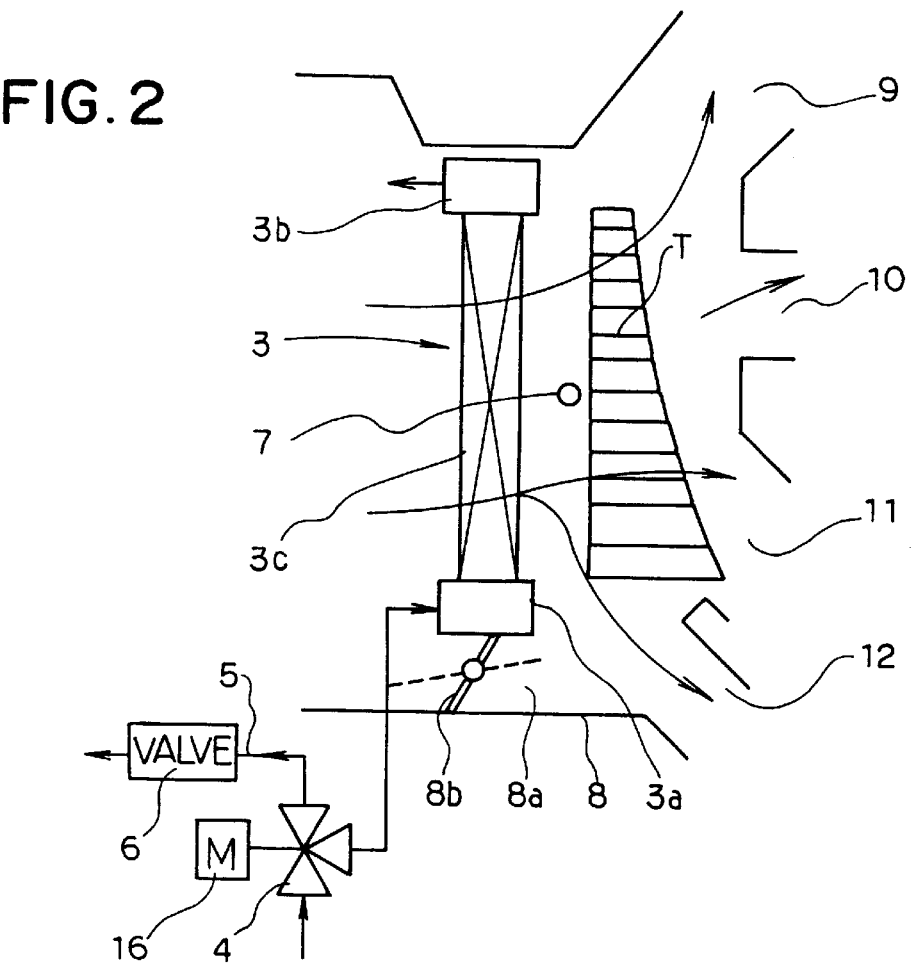
FIG. 2 is a sectional view indicating a position of a heat exchanger for heater use according to the present invention within an air-conditioning apparatus air duct.

In FIG. 2, the vent 9 is an upper (face) vent to blow air toward a passenger's head within the passenger compartment, the vent 10 is a defroster vent to blow air at a vehicle front windshield to remove fog from the windshield, the vent 11 is a foot vent for front seat use to blow air on the feet of front seat passengers, and the vent 12 is a foot vent for the back seat use to blow air on the feet of back seat passengers.

Reference numeral 13 in FIG. 1 denotes a temperature control to set a target temperature (the desired temperature of the passenger compartment) for passenger compartment temperature -control, and is composed of a switch, variable resistor, or the like which is manually operable by the passenger. Numeral 14 denotes a sensor group to detect environmental factors relating to passenger compartment temperature control of ambient temperature, hot water temperature, amount of sunlight, and the like. Numeral 15 denotes an air-conditioning controller to output temperature-control signals based on input signals from these sensors 7 and 14 and the temperature control 13 and the like, and is composed of a microcomputer or other appropriate control device.

Reference numeral 16 denotes a servomotor controlled by temperature-control signals from this air-conditioning controller 15, and rotates a needle valve 17 of the flow control valve 4. Herein, the device for valve operating is not necessarily an electrical actuator such as the servomotor 16, but may be a known manually operated mechanism employing levers, wires, and the like.

Figure 3:
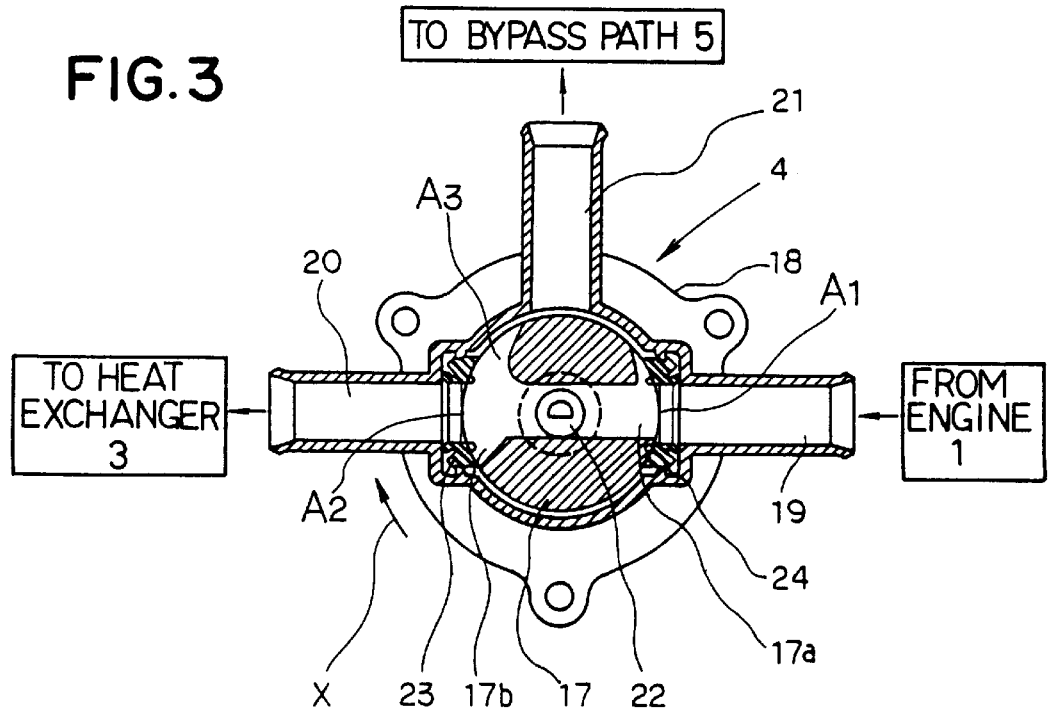
FIG. 3 is a cross-sectional view of a flow control valve according to the present invention.

FIG. 3 shows the flow control valve 4 according to the present embodiment. The above-mentioned needle valve 17 has a substantially cylindrical configuration, is made of resin material and is disposed and housed rotatably within a valve housing 18 also formed of resin in a cylindrical configuration. Consequently, the needle valve 17 is a rotatable rotor.

A hot water inlet pipe 19 into which hot water flows from the engine 1, a hot water outlet pipe 20 which causes inflowing hot water from this hot-water inlet pipe 19 to flow out toward the heat exchanger 3, and a bypass outlet pipe 21 which causes hot water to flow out toward the bypass circuit 5 of the heat exchanger 3 are formed integrally in the foregoing valve housing 18.

Control passages 17a and 17b which control opening surface areas of the foregoing pipes 19, 20, and 21 by a predetermined mutual relationship to be described later are formed in the needle valve 17. Reference numeral 22 denotes a shaft to operate and rotate the needle valve 17, and is joined integrally to the needle valve 17. This shaft 22 protrudes from an outer portion of the valve housing 18, and is interconnected with an electrical actuator such as the previously described servomotor 16 or a manually operated mechanism employing levers, wires and the like, to rotate and operate the needle valve 17 by these devices.

Reference numerals 23 and 24 denote gaskets composed of an elastic material such as rubber, the overall configuration thereof being rectangular with an opening in the center portion, and which are arranged between an outer peripheral surface of the needle valve 17 and an inner peripheral surface of the valve housing 18. These gaskets 23 and 24 prevent hot water from flowing directly between the pipes 19, 20 and 21 and not via the control passages 17a and 17b of the needle valve 17. According to the present embodiment, two gaskets are only provided in correspondence with the hot water inlet pipe 19 and the hot water outlet pipe 20, but a gasket in correspondence with the bypass outlet pipe 21 may also be provided.

The present invention controls the opening surface areas of the pipes 19, 20, and 21 by a predetermined mutual relationship indicated in TABLE I below using the control passages 17a and 17b in accordance with the degree of opening (valve angle of rotation) of the above-mentioned needle valve 17. To realize the mutual relationship indicated in TABLE I, the concrete configurations of the control passages 17a and 17b of the foregoing needle valve 17 are formed in the configurations indicated in the development diagram of FIGS. 5A–5G.

Figure 4A:
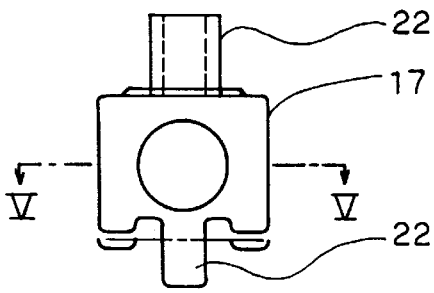
FIGS. 4A and 4B are a front view and a cross-sectional view taken along line IVB—IVB of an individual needle valve (rotor) of a flow control valve according to the present invention.
Figure 4B:
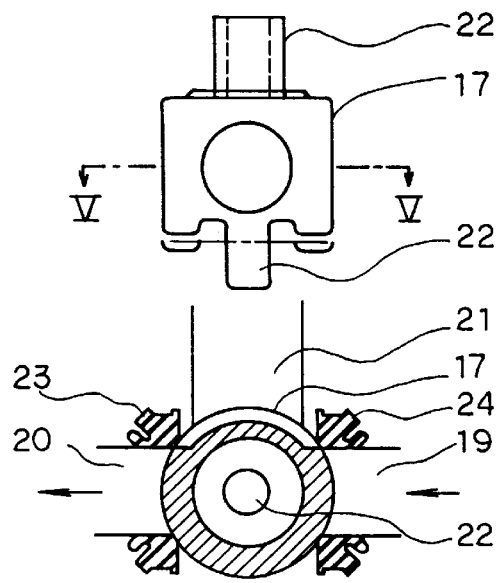

Moreover, in FIGS. 4A and 4B and in the embodiment diagram of FIGS. 5A–5G, the portion 17a' of the control passage 17a which does not oppose the hot-water inlet pipe 19 and the portion 17b' of the control passage 17b which constantly remains opposing the bypass outlet pipe 21 are only provided for reasons of resin formation of the needle valve 17, and are not required in the functioning of the needle valve 17.

In TABLE I, the following points exist as characteristic matters to be given caution.

1) During non-heating (which becomes the time of maximum cooling when the air-conditioning apparatus for automotive use is equipped with a cooling function), a minimum opening equivalent to a 2 mm. dia. round hole is provided so as to

TABLE I

| VALVE OPERATING MODE | AIM | HOT WATER INLET PIPE 19 (FROM ENGINE 1) | HOT WATER OUTLET PIPE 20 (TO HEAT EXCHANGER 3) | BYPASS OUTLET PIPE 21 (TO BYPASS PATH 5) |
| --- | --- | --- | --- | --- |
| Non-Heating | Prevent clog from casting sand, flow noise | Minimum opening equivalent to 2 mm. dia. hole | Fully closed | Fully or nearly fully open |
| Minute Heating (Valve Open ≦10°) | Prevent casting sand clog; improve minute flow ctrl. (lower ctrl. gain) | Minute opening (approximately double outlet 20 opening area) | Minute opening (approximately half inlet 19 area) | Fully or nearly fully open |
| Transition from Minute to Maximum Capacity | Improve minute flow control (reduce control gain) | Minute opening to large opening (approx. equal to outlet 20 area) | Minute opening to large opening (approx. equal to inlet 19 area) | Fully open or nearly fully open |
| Maximum Heating Capacity (Valve Opening ≧60°) | Ensure maximum heating capacity | Fully or nearly fully open | Fully or nearly fully open | Fully or nearly fully closed | continue the flow of hot water from the hot-water inlet pipe 19 to the bypass outlet pipe 21 without making the hot-water inletpipe 19 to open fully, and so the occurrence of noise from a water-hammer effect due to sudden interruption of the flow of hot water can be prevented, and occurrence of flow noise can also be prevented by assuring an opening surface area equivalent to a 2 mm. dia. round hole.

Additionally, because casting sand in the hot-water circuit is normally minute material of 1 mm. dia. or less, obstruction of the flow control valve passage due to foreign matter such as casting sand can adequately be prevented by establishing a minimum opening of the foregoing size.

2) During minute capacity (i.e., a valve opening degree of 100 or less; according to the present embodiment the maximum valve opening degree is 60°), the state of two-stage restriction restricting both the opening area of the hot water inlet pipe 19 and the opening area of the hot water outlet pipe 20 (the time of minute capacity of FIG. 1 indicates typically a state of two-stage restriction thereof) is obtained, and moreover the middle of the restricting portion of the hot water inlet pipe 19 and the hot water outlet pipe 20 (area $A_1$ of FIG. 1) communicates with the bypass circuit 5 at an adequately large opening area by the bypass outlet pipe 21 in a fully open state, and so the differential pressure before and after the heat exchanger 3 can be made sufficiently small.

As a result of this, the change in hot-water flow (ultimately the change in the temperature of air blown into the passenger compartment) with respect to the change in degree of valve opening (needle valve angle or rotation) can be alleviated without requiring a particularly small opening area. This is reduction in control gain.

The temperature of air blown into the passenger compartment can be controlled precisely, and along with this, obstruction of the flow control valve passage due to foreign matter such as casting sand can adequately be prevented by this reduction in control gain.

Additionally, by establishing the opening area of the restricting portion of the hot-water inlet pipe 19 to be about twice the opening area of the restricting portion of the hot-water outlet pipe 20, the amount of bypass flow flowing from the hot-water inlet pipe 19 to the bypass outlet pipe 21 can be increased and the flow of foreign matter such as casting sand to the bypass outlet pipe 21 can be facilitated, and passage obstruction due to foreign matter such as casting sand can be prevented more effectively.

3) At any position from minute capacity to large capacity, control gain can be reduced and the temperature of air blown into the passenger compartment can be controlled precisely by the above-described two-stage restriction. Additionally, because danger of passage obstruction due to foreign matter such as casting sand is eliminated by the increase in the restricting portion opening area, the restricting portion opening area of the hot water inlet pipe 19 and the restricting portion opening surface area of the hot water outlet pipe 20 are established equivalently in this state.

Figure 6A:
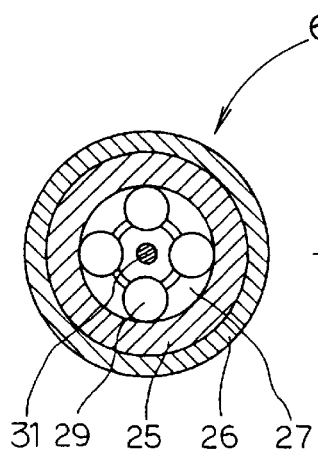
FIGS. 6A and 6B are axial and longitudinal cross-sectional views, respectively, of a constant-differential pressure valve according to the present invention, FIG. 6A being a cross-section taken along line VIA—VIA of FIG. 6B.
Figure 6B:
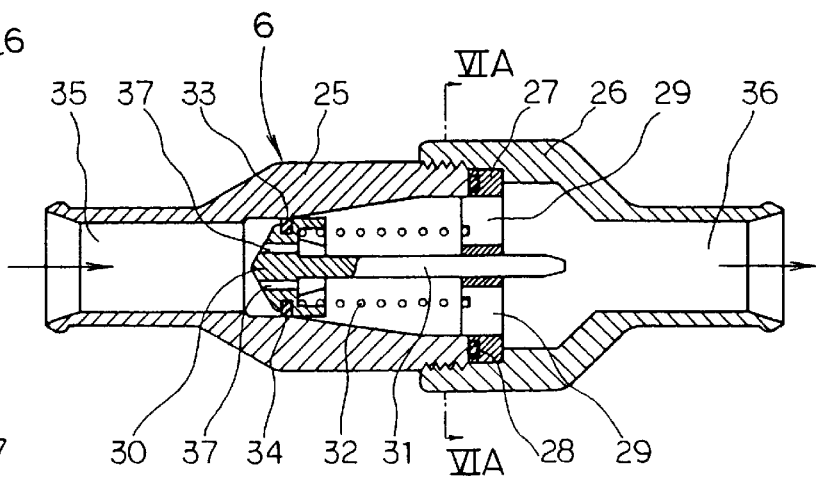

FIGS. 6A and 6B indicate a specific embodiment of the constant-differential pressure valve (pressure-responsive valve) 6 installed in the bypass circuit 5. Two housings 25 and 26 made of resin are joined by screws or the like, and a seating plate 27 made of resin is fixed watertightly between the two via an O-ring or seal member 28. A plurality of water-passage holes 29 each having a sufficiently opening surface area are provided in this seating plate 27 to make water-passage resistance due to the seating plate 27 smaller.

Reference numeral 30 denotes a needle valve of conical configuration which is mated movably axially with a center hole portion of the seating plate 27 by a shaft portion 31 made integrally therewith. A coil spring or spring device 32 is interposed between the needle valve 30 and the seating plate 27, and the needle valve 30 is constantly biased to the left-hand side of the drawing (i.e., the valve-closed direction) by this spring to contact a valve seat 33 formed on an inner periphery of the housing 25.

A ring-shaped groove is formed on an outer periphery of the conical portion of the above-described needle valve 30, and a seal member 34 composed of an elastic material such as rubber is disposed in this groove to heighten the sealing effect when the needle valve 30 is closed.

Accordingly, when a pressure differential between an inlet 35 formed in the housing 25 and an outlet 36 formed in the housing 26 reaches a predetermined valve, the differential pressure overcomes the force of the spring 32 to move the needle valve 30 to the right-hand side of the drawing so that the needle valve 30 opens. Furthermore, to assure maximum heating capacity also when the engine is idling (i.e., when engine speed is lowest), in a case where required hot-water flow is adequately obtained, it is also acceptable to provide a plurality of through-hoes (bypass holes) 37 in the conical portion of the needle valve 30 so that hot water flows through these holes 37 when the valve is closed as well.

In the above-described FIG. 2, the heat exchanger 3 has an inlet-side tank 3a of hot water at a lower portion thereof and has an outlet-side tank of hot water at an upper portion thereof; accordingly, a core portion 3c composed of a multiplicity of flat tubing and corrugated fins disposed in parallel is formed between the two upper and lower tanks 3a and 3b. Herein, the core portion 3c is structured as a unidirectional flow type in which hot water flows in only one direction from the inlet-side tank 3a to the outlet-side tank 3b.

Consequently, in a distribution of vent-air temperature thereof, the heat exchanger lower portion has the highest temperature, as shown in the temperature-width region T of FIG. 2, and the temperature of a core portion declines with proximity to the upper portion. Specifically, a blowing temperature width of 45° C. at the lowermost portion and of 25° C. at the uppermost portion may be produced.

In accordance with the foregoing distribution of vent-air temperature the foot vent for back seat use 12 which requires high-temperature blown-air is disposed lowermost, with the foot vent for front seat use 11, defroster vent 10, and upper vent 9 disposed sequentially upward therefrom. a bypass air passage 8a is formed between the inlet-side tank 3a of the heat exchanger 3 and the air duct 8, and a damper 8b is installed in this air passage 8. During a bi-level mode which blows conditioned air from the upper vent 9 and the lower vents 11 and 12 simultaneously, the damper 8a is opened and chilled air flows directly into the lower side of the heat exchanger 3, thereby preventing an excessive enlargement of a temperature differential between the upper and lower blown air.

Furthermore, although not illustrated, it is also acceptable to integrate the flow control valve 4, constant-differential pressure valve 6, and servomotor 16 according to the present invention with the heat exchanger prior to assembly 3, and thereafter install the integral structure of these components in the air duct or heater case 8, thus enhancing the ease of assembly and compactness of configuration of the heat-exchanger portion.

A mode of operation according to the present embodiment with the above-described structure will be described next. At a time of maximum heating capacity, the needle valve 17 of the flow control valve 4 is rotated by the servomotor 16 or a manually operated mechanism to a position of maximum opening degree (specifically, a position where the degree of valve opening is 60°).

The control passages 17a and 17b of the needle valve 17 thereby respectively have maximum overlap with the hot water inlet pipe 19 and hot water outlet pipe 20 of the valve housing 18, and these two pipes 19 and 20 are fully opened. Meanwhile, the control passage 17b opens only slightly to the bypass outlet pipe 21, and assumes a state close to substantially fully closed.

As a result of this, substantially all hot water from the engine 1 flows into the heat exchanger 3 side, and only a minute amount of hot water flow to the bypass path 5. The heat exchanger 3 can thereby provide maximum heating capacity. At this time, the interval between the hot-water inlet pipe 19 and the hot-water outlet pipe 20 has maximum fluid flow therethrough, and so there is no danger of passage obstruction due to foreign matter such as casting sand, flow noise due to sudden restriction, or the like.

Additionally, circulating flow to a radiator for heat-radiating use of the engine 1 can be assured by making the bypass path 5 assume a substantially fully open state as described above.

Next, during non-heating (i.e., the time of maximum cooling when the air-conditioning apparatus for automotive use is equipped with a cooling function), the needle valve 17 of the flow control valve 4 is rotated by the servomotor 16 or manually operated to a position of zero degrees of opening. At this position of zero degrees of opening, the control passage 17b of the needle valve 17 overlaps the bypass outlet pipe 21, this pipe 21 is fully opened, and the hot-water outlet pipe 20 is fully closed.

Meanwhile, as shown in the uppermost portion of the development diagrams in FIGS. 5A–5G, the control passage 17a overlaps the hot-water inlet pipe 19 with only a protruding portion of a right-edge portion thereof, and establishes a minimum opening surface area equivalent to a 2 mm. dia. round hole without fully closing the hot-water inlet pipe 19.

Because the flow of hot water from the hot-water inlet pipe 19 to the bypass outlet pipe 21 can be continued by the above-described needle valve position, occurrence of noise from a water-hammer effect due to sudden interruption of the flow of hot water can be prevented, and along with this, occurrence of flow noise can also be prevented by assurance of the equivalent of a 2 mm. dia. or greater round hole.

Additionally, because casting sand in the hot-water circuit is normally minute material of 1 mm. dia. or less, obstruction of the flow control valve passage due to foreign matter such as casting sand can adequately be prevented by establishing a minimum opening of the foregoing size.

Furthermore, circulating flow to a radiator for heat-radiating use of the engine 1 can be assured by establishing the opening surface area of the hot-water inlet pipe 19 to be a minimum opening surface area equivalent to a 2 mm. dia. round hole as described above.

Next, at a time of minute heating capacity, the needle valve 17 is rotated to a valve opening degree of 10° or less indicated in FIGS. 5A–5G, and so the control passages 17a and 17b overlap both the hot-water inlet pipe 19 and the hot-water outlet pipe 20 with a small surface area, and a state of two-stage restriction (the time of minute capacity in FIG. 1 typically indicates a state of two-stage restriction thereof) which restricts both the opening area of the hot-water inlet pipe 19 and the opening area of the hot-water outlet pipe 20 is obtained, and moreover the middle portion of the restricting portion of the hot-water inlet pipe 19 and the hot-water outlet pipe 20 (area $A_1$ of FIG. 1) is connected to the bypass circuit 5 via a sufficiently large opening area by the bypass outlet pipe 21 in a fully open state, and so the pressure of this middle portion $A_1$ can be lowered.

As a result of this, the differential pressure between the inlet and outlet of the heat exchanger 3 can be made sufficiently small, and so the change in hot water flow (ultimately the change in the temperature of air blown into the passenger compartment) with respect to the change in degree of valve opening (needle valve angle or rotation) can be alleviated without requiring a particularly small opening area. That is to say, control gain of the blown-air temperature can be reduced.

By this reduction in control gain, the temperature of air blown into the passenger compartment can be controlled precisely, and along with this, the need to establish a particularly small opening surface area of the hot-water inlet pipe 19 and the hot-water outlet pipe 20 is eliminated, and so obstruction of the flow control valve passage due to foreign matter such as casting sand can adequately be prevented.

Additionally, by establishing the opening surface area of the restricting portion of the hot-water inlet pipe 19 to be about twice the opening surface area of the restricting portion of the hot-water outlet pipe 20, the amount of bypass flow flowing from the hot-water inlet pipe 19 to the bypass outlet pipe 21 can be increased and the flow of foreign matter such as casting sand to the bypass outlet pipe 21 can be facilitated, and foreign matter which attempts to remain in the control passage 17b forming the restricting portion of the hot-water outlet pipe 20 can also thereby be washed away by the foregoing bypass flow, and passage obstructions due to foreign matter such as casting sand can be prevented more effectively.

Next, during a transition from minute heating capacity to large heating capacity, the needle valve 17 is rotated from a rotational position exceeding a degree of valve opening of 10° as shown in FIGS. 5A–5G to a rotational position of less than 60°, but even at a needle-valve rotational position such as this, control gain can similarly be reduced and the temperature of air blown into the passenger compartment can be controlled precisely by the above-described two-stage restriction. Additionally, since the danger of passage obstruction due to foreign matter such as casting sand is eliminated by the increase in the restricting portion opening area, the opening area of the restricting portion of the hot-water inlet pipe 19 and opening area of the restricting portion of the hot-water outlet pipe 20 are substantially equal in this state.

In the engine 1 which constitutes the hot-water supply source of the above-described automotive air-conditioning apparatus, speed changes greatly in accordance with changes in travelling conditions of the automobile, and so the hot-water supply pressure from the engine 1 changes greatly according to changes in travelling conditions, and this becomes a major disturbance element with respect to hot-water flow control by the flow control valve 4 and even blown-air temperature control, but according to the present invention, fluctuation in hot-water flow due to change in hot-water supply pressure from the engine 1 is favorably eliminated by the establishment of the constant-differential pressure valve 6 connected to the bypass circuit 5.

That is to say, in the constant-differential pressure valve 6, when ho-water supply pressure from the engine 1 rises and the differential pressure between the upstream and downstream portions of the needle valve 30 becomes higher than a predetermined pressure determined by the spring 32, the needle valve 30 moves to the right in FIG. 6B to open and the clearance between the needle valve 30 and the valve seat 33 varies in accordance with the foregoing differential pressure, and the constant-differential pressure valve 6 operates to maintain a pressure differential between the inlet 35 and outlet 36 thereof at a uniform value.

The hot-water pressure applied to the heat exchanger 4 can thereby be maintained at a uniform value regardless of fluctuation in hot-water supply pressure from the engine 1, and fluctuation of hot-water flow due to change in hot-water supply pressure from the engine 1 can be prevented.

Figure 7:
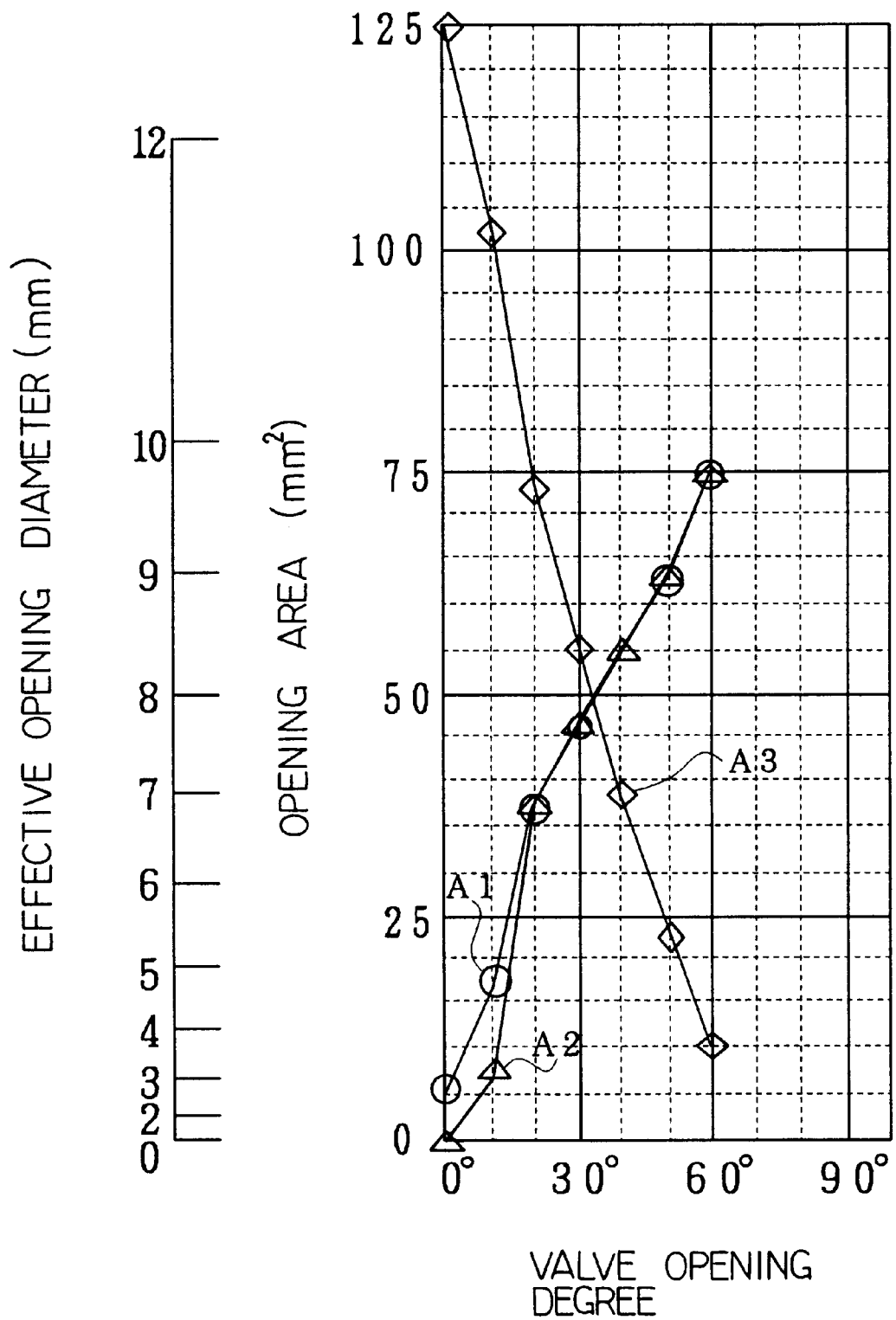
FIG. 7 is a graph showing degree of opening characteristics of a needle valve (rotor) of a flow control valve according to the present invention.

Next, to describe experimental results based on the above-described first embodiment, FIG. 7 takes opening area (mm$^2$) and surface area equivalent to a round hole as the abscissa axis, and takes degree of valve opening as the ordinate axis. Graph trace A1 denotes restriction opening area of the hot-water inlet pipe 19, trace A2 a restriction opening area of the hot-water outlet pipe 20, and trace A3 a restriction opening area of the bypass outlet pipe 21.

Figure 8:
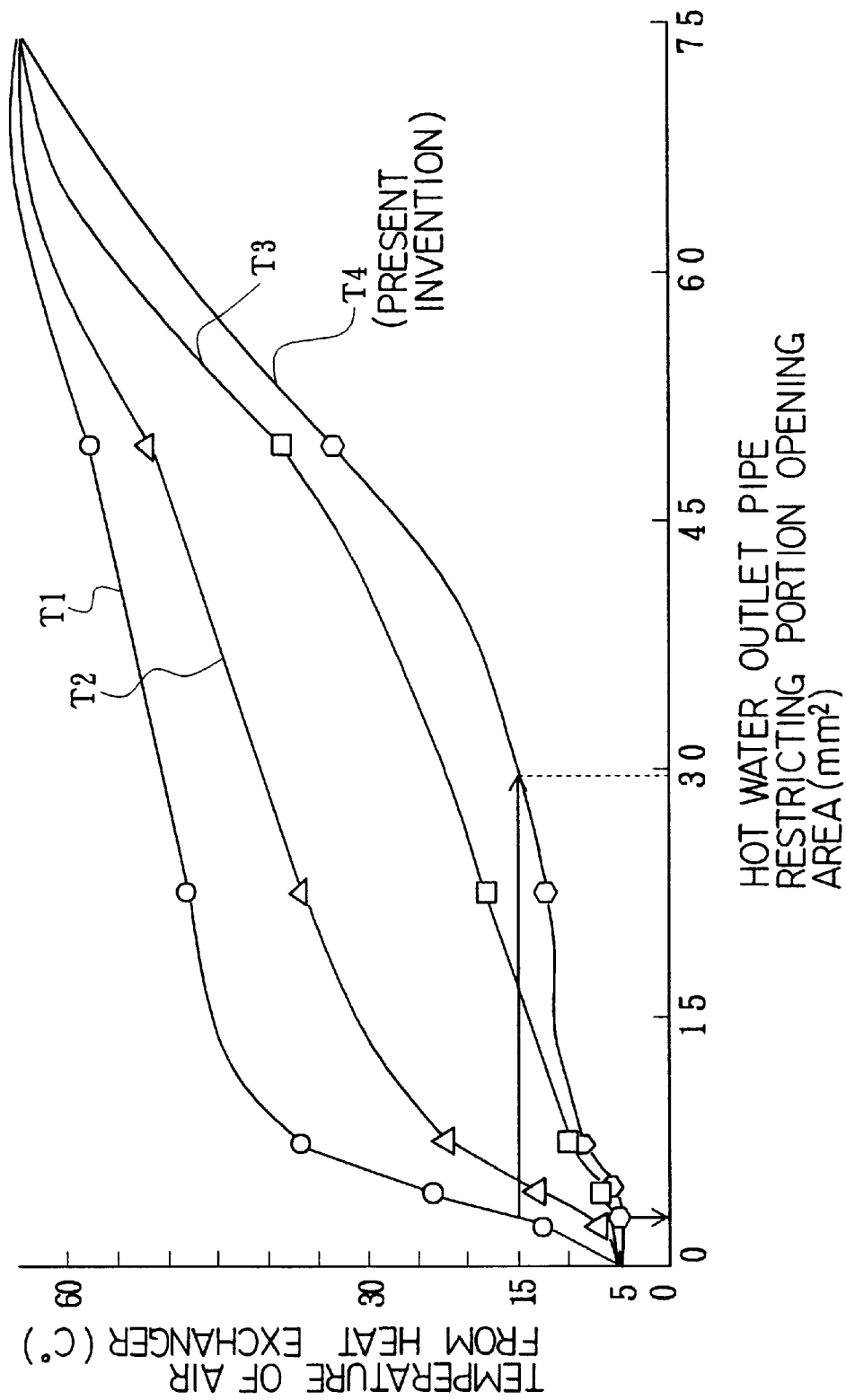
FIG. 8 is a graph indicating a gain-reduction effect of temperature control by various flow control valves.

Next, FIG. 8 shows the control-gain reduction effect of temperature control according to the present invention. Blown-air temperature of the heat exchanger 3 is taken as the abscissa axis, and opening area A2 of the restricting portion of the hot water outlet pipe (i.e., the passage to the heat-exchanger inlet) is taken as the ordinate axis.

In FIG. 8, T1 is characteristic curve a in a case where a flow control valve of single-stage restriction to restrict only the passage to the hot-water outlet pipe 20 is used, T2 is characteristic curve in a case where a flow control valve of two-stage restriction to restrict the passages to both the hot-water inlet pipe 19 and the hot-water outlet pipe 20 is used, T3 is characteristic curve in a case where a flow control valve combining a bypass circuit and single-stage restriction to restrict only the passage to the hot-water outlet pipe 20 is used, and T4 is characteristic curve in a case using a flow control valve combining a bypass circuit and a two-stage restriction to restrict the passages to both the hot-water inlet pipe 19 and the hot-water outlet pipe 20.

As is understood from FIG. 8, according to the present invention, control gain can be reduced as shown by the characteristic curve 1 of T4, and so when the blown-air temperature of the heat exchanger 3 is 15° C., the opening area A2 can be expanded up to 8.8 mm$^2$ (equivalent to a 6 mm. dia. round hole). Incidentally, with a flow control valve of single-stage restriction ordinarily employed in an automotive air-conditioning apparatus, the opening surface area A2 becomes a small surface area of 3 mm$^2$ (equivalent to a 1.9 mm. dia. round hole) and the minimum temperature width (i.e., the resolution of temperature control) controllable by regulation of the valve opening degree becomes larger, and so precise temperature control becomes impossible.

Additionally, even when the blown-air temperature is 7° C., according to the present invention a size of 4.2 mm$^2$ (equivalent to a 2.3 mm. dia. round hole) can be assured for the opening surface area A2. In contrast, with an ordinary flow control valve of single-stage restriction the opening surface area A2 becomes a small surface area of 1 mm$^2$ (equivalent to a 1.9 mm. dia. round hole), and it is susceptible to passage obstruction due to foreign matter such as casting sand.

Moreover, a device according to the present invention can adequately reduce control gain of temperature control even in comparison with characteristics in a case where single-stage restriction and a bypass circuit are combined (T3).

According to the present invention, in the foregoing manner, control gain of temperature control can be adequately reduced, and so coexistence of both precise temperature control and prevention of passage obstruction due to foreign matter such as casting sand can be favorably achieved.

Figure 9:
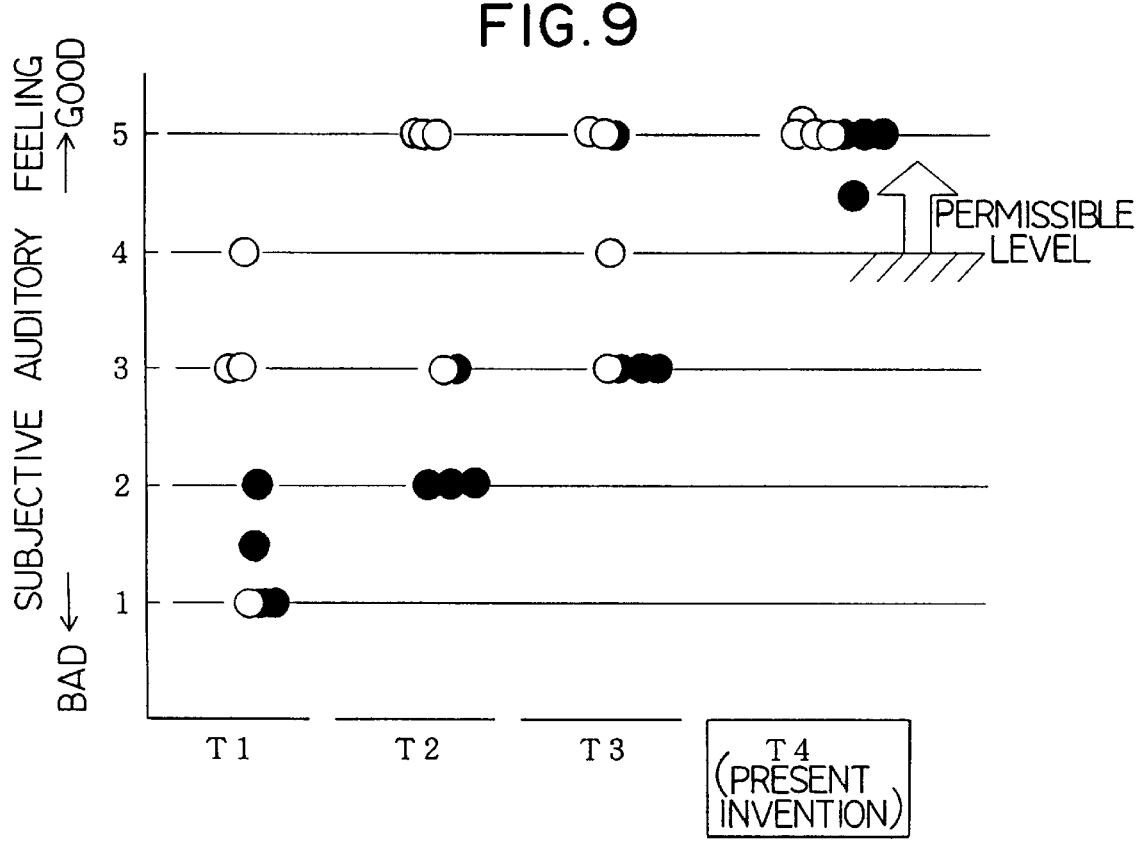
FIG. 9 is a chart indicating subjective flow-noise auditory feelings due to various flow control valves.

FIG. 9 shows experimental results of subjective auditory testing of flow noise generated by a flow control valve. A judgment level of auditory feeling is taken as the abscissa axis, and types of flow control valves T1 through T4 are taken as the ordinate axis. Herein, the types of flow control valves T1 through T4 are identical with T1 through T4 of the above-described FIG. 8, and T4 is a device according to the present invention.

Additionally, the subjective experimentation of flow-noise auditory feeling of FIG. 9 used a sample population of four persons, and judgment levels of auditory feeling were established as below:

1: Flow noise is extremely large and is of great concern.

2: Flow noise is large and is of concern.

3: Flow noise is small and is somewhat of concern.

4: Flow noise is extremely small and is not of concern.

5: Flow noise is absent and is not of concern.

Accordingly, experimentation into sensory evaluation was conducted at engine idle speed and at a speed of 4,000 rpm. The black circles of FIG. 9 indicate auditory feeling at 4,000 rpm, and the white circles indicate auditory feeling at idle speed.

In FIG. 9, a judgment level of 4 is taken to be a minimum permissible level, and it is understood that with the device according to the present invention, auditory feeling is at the minimum permissible level or better both at idle speed and at 4,000 rpm.

Figure 10:
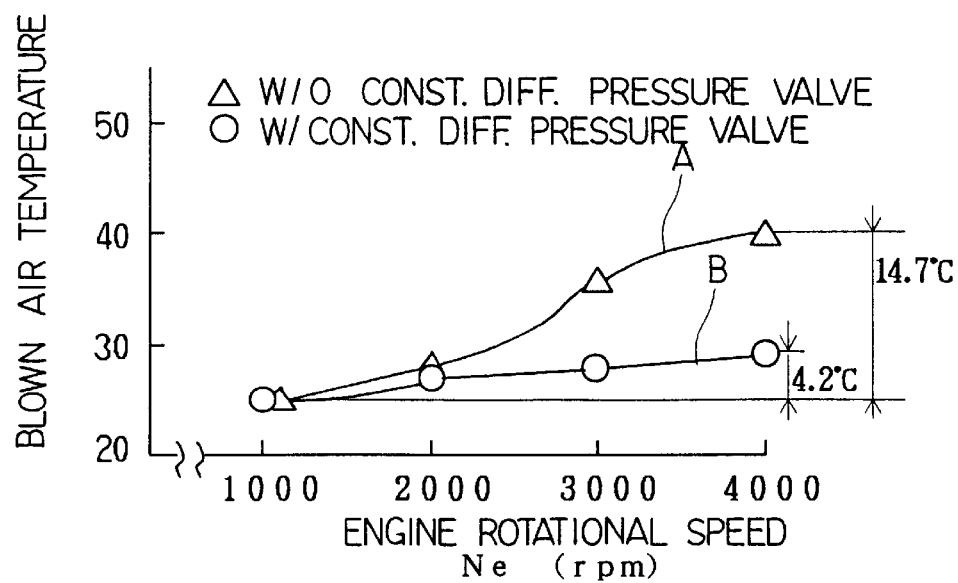
FIG. 10 is a graph showing a relationship between fluctuations in engine speed and blown-air temperature.

FIG. 10 shows the reduction of blown-air temperature fluctuations due to engine-speed fluctuations (i.e., hot-water supply pressure fluctuation from the engine 1) in a case where the degree of valve opening of the flow control valve establishes a blown-air temperature of 25° C., engine speed Ne fluctuated in a range of 1,000 rpm to 4,000 rpm, and the fluctuation of the heat-exchanger blown-air temperature was measured.

Trace A of FIG. 10 is a case where no constant-differential pressure valve 6 was provided in the bypass circuit 5, the above-mentioned fluctuation range is 14.7° C., but the above-mentioned fluctuation range can be suppressed to a small value of 4.2° C. by providing the constant-differential pressure valve 6 in the bypass circuit 5, as shown by trace B.

In this way, according to the present invention, it is understood that fluctuation of blown-air temperature due to engine-speed fluctuation can be effectively reduced by the addition of the constant-differential pressure valve 6.

The present invention is not exclusively the above-described first embodiment, but is variously modifiable in keeping with the intentions of the technical concepts of the stated claims; other embodiments will be described hereinafter.

In a second embodiment of the present invention as shown in FIG. 11, whereas the hot-water inlet and outlet pipes 19 and 20 are disposed along the same horizontal axis, the bypass outlet pipe 21 is arranged skew to the above-mentioned axis. A control passage 17c for passage-opening surface-area control is additionally formed in the needle valve 17.

In a third embodiment of the present invention, the bypass outlet pipe 21 is arranged in the valve housing 18 on the same side as the hot-water outlet pipe 20 and below the hot-water outlet pipe 20 as shown in FIG. 12.

Figure 13A:
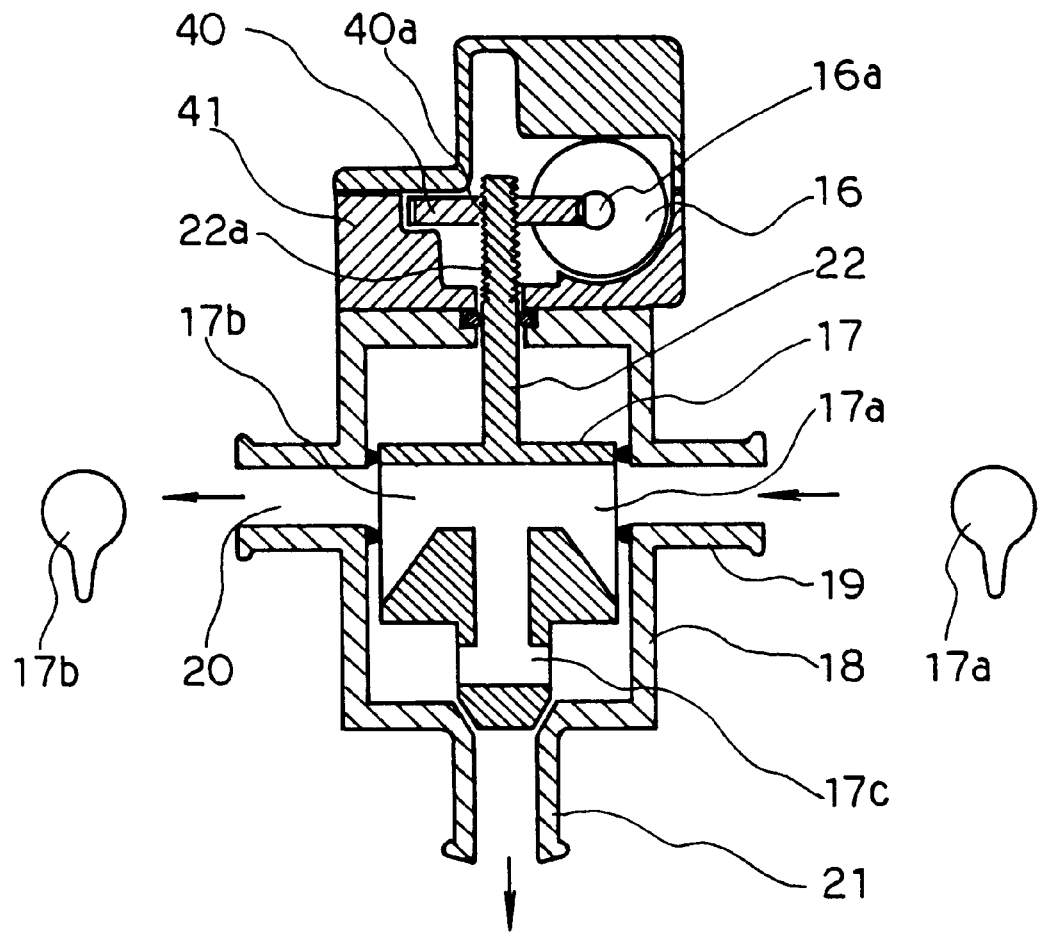
FIG. 13A is a cross-sectional view showing a fourth embodiment of a flow control valve according to the present invention.
Figure 13B:
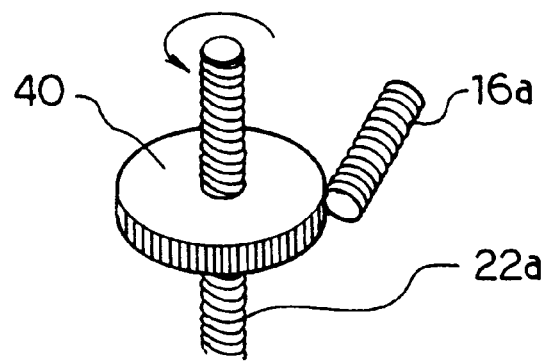
FIG. 13B is a perspective view of a gear-mechanism portion of FIG. 13A.

According to the foregoing first through third embodiments, the needle valve 17 is structured as a rotor or rotating type which is rotated and operated, but according to a fourth embodiment as shown in FIG. 13, the present invention can be practiced even when the valve 17 is structured as a reciprocating type valve.

That is to say, in FIG. 13A three pipes 19, 20, and 21 are disposed with respect to the valve housing 18 similarly to FIGS. 11A and 11B, and accordingly the valve 17 is housed vertically reciprocally within the housing 18.

A valve drive mechanism employing a servomotor 16 is formed integrally with the valve housing 18, and rotation of the servomotor 16 is conveyed to a spur gear 40 by a worm gear 16a on a rotating shaft. Herein, the spur gear 40 is rotatable within a drive-mechanism case 41, but does not shift in the axial direction of the needle valve 17.

Additionally, the spur gear 40 is formed with a female screw thread 40a on an inner peripheral portion thereof, and this female screw thread 40a mates with a male screw thread 22a on the shaft 22 of the needle valve 17. Consequently, the valve 17 reciprocates vertically via the mating mechanism of the worm 16a, spur gear 40, female screw thread 40a, and male screw thread 22a by rotation of the servomotor 16, and the passage opening surface area to the several pipes 19, 20, and 21 can be controlled.

FIGS. 14A–14E show fifth through ninth embodiments relating to modifications of the hot-water circuit. FIG. 15A shows a fifth embodiment which eliminates the constant-differential pressure valve 6 from the bypass circuit 5 of FIG. 1.

Figure 14A:
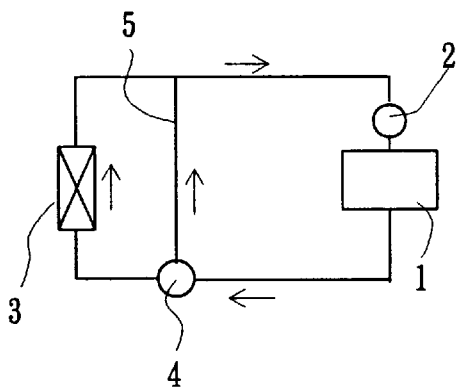
FIGS. 14A and 14B are hot-water circuit diagrams indicating fifth through ninth embodiments according to the present invention.
Figure 14B:
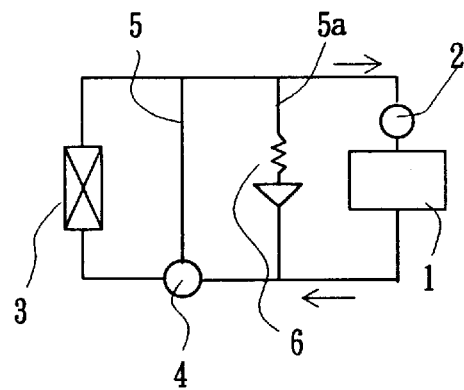

FIG. 14B shows a sixth embodiment which adds, in addition to the first bypass circuit 5 for which opening and closing are controlled by the flow control valve 4, a second bypass circuit 5a for which opening and closing are not controlled by the flow control valve 4. This second bypass circuit 5a is normally connected in parallel with the engine 1, and the constant-differential pressure valve 6 is installed in the second bypass circuit 5a.

Figure 14C:
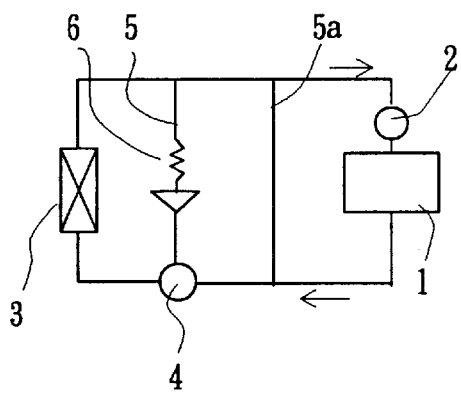

FIG. 14C shows a seventh embodiment which adds, in addition to the first bypass circuit 5 in which a constant-differential pressure valve 6 is installed, a second bypass circuit 5a for which opening and closing are not controlled by the flow control valve 4. This second bypass circuit 5a is normally connected in parallel with the engine 1.

Figure 14D:
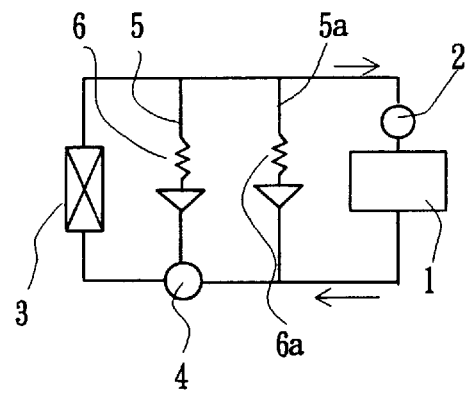

FIG. 14D shows an eighth embodiment which adds, in addition to the first bypass circuit 5 in which a constant-differential pressure valve 6 is installed, a second bypass circuit 5a for which opening and closing are not controlled by the flow control valve 4. This second bypass circuit 5a is also installed with a constant-differential pressure valve 6a.

Figure 14E:
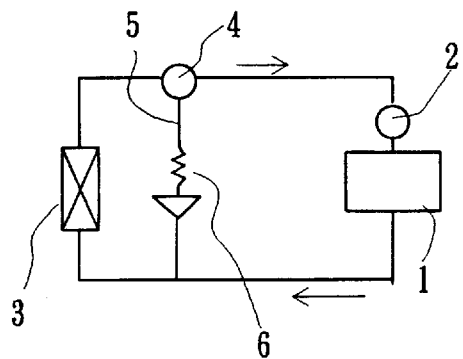

FIG. 14E a ninth embodiment wherein the flow control valve 4 is disposed on a hot-water outlet side of the heat exchanger 3; the hot-water inlet pipe 19 of FIG. 3 is connected to the hot-water outlet side of the heat exchanger 3, the hot-water outlet pipe 20 is connected to an intake side of the water pump 2 of the engine 1, and accordingly the bypass outlet pipe 21 becomes a bypass inlet pipe, and this bypass inlet pipe 21 is connected to an outlet side of the bypass circuit 5.

According to this ninth embodiment, if during non-heating the hot-water inlet pipe 19 is fully closed, and along with this, the hot-water outlet pipe 20 is opened with a minimum opening surface area, and accordingly the bypass inlet pipe 21 is fully opened, a mode of operation and effects similar to the first embodiment can be demonstrated.

In the various hot-water circuits indicated in the foregoing FIGS. 14A–14E, the gain-reduction effect of temperature control which is a significant advantage of the present invention, and the obstruction-prevention effect of the valve passage due to foreign matter such as casting sand, can be provided.

Figure 15:
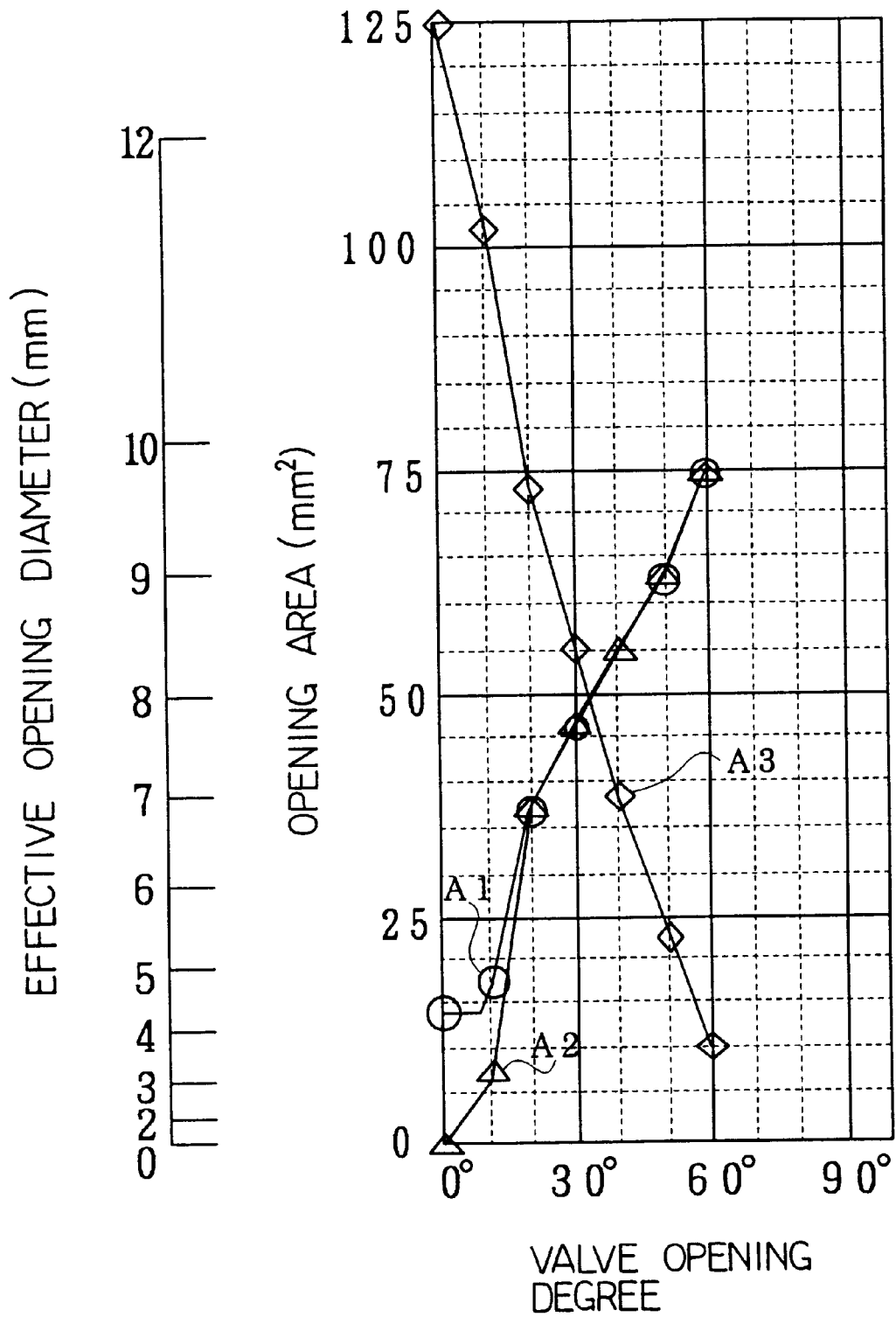
FIG. 15 is a graph showing the degree of opening characteristics of a needle valve (rotor) of a flow control valve according to a tenth embodiment of the present invention.

FIG. 15 is a graph indicating degree of opening characteristics of a needle valve 17 similar to the above-described FIG. 7; according to this tenth embodiment, opening area A1 of the hot-water inlet pipe 19 is maintained unchanged at a uniform value of minimum opening surface area (for example 14 mm$^2$) for a predetermined interval from a valve degree of opening of zero (for example an interval from 0° to 8°). In this way, according to the present invention, it is possible to obtain the advantageous effects of the present invention even when maintaining the inlet opening area unchanged during a predetermined interval of needle valve opening degree without causing the respective opening areas A1, A2, and A3 to change continuously with respect to the valve degree of opening.

FIG. 14 discloses an embodiment providing a bypass circuit 5c having a constant-differential pressure valve or equalizing valve 6 in the bypass circuit 5 connected to the bypass outlet pipe 21 of the flow control valve 4, and also providing a constantly open bypass circuit 5d in parallel with this bypass circuit 5c.

The foregoing constant-differential pressure valve 6 abandons the bypass holes 37 in the constant-differential pressure valve 6 indicated in the above-described FIGS. 6A and 6B, and in other respects is identical to the valve shown in FIGS. 6A and 6B.

The bypass circuit 5c having the constant-differential pressure valve 6 is for absorbing fluctuations in blown-air temperature of the heat exchanger 3 based on hot-water flow fluctuations due to engine speed fluctuation, and the constantly open bypass circuit 5d is for reducing control gain of blown-air temperature control due to the flow control valve 4.

Herein, the bypass circuit 5c having the constant-differential pressure valve 6 is established so that water-passage resistance thereof becomes smaller than the water-passage resistance of the bypass circuit 5d when the constant-differential pressure valve 6 is fully open for the purpose of the foregoing objects.

Figure 17:
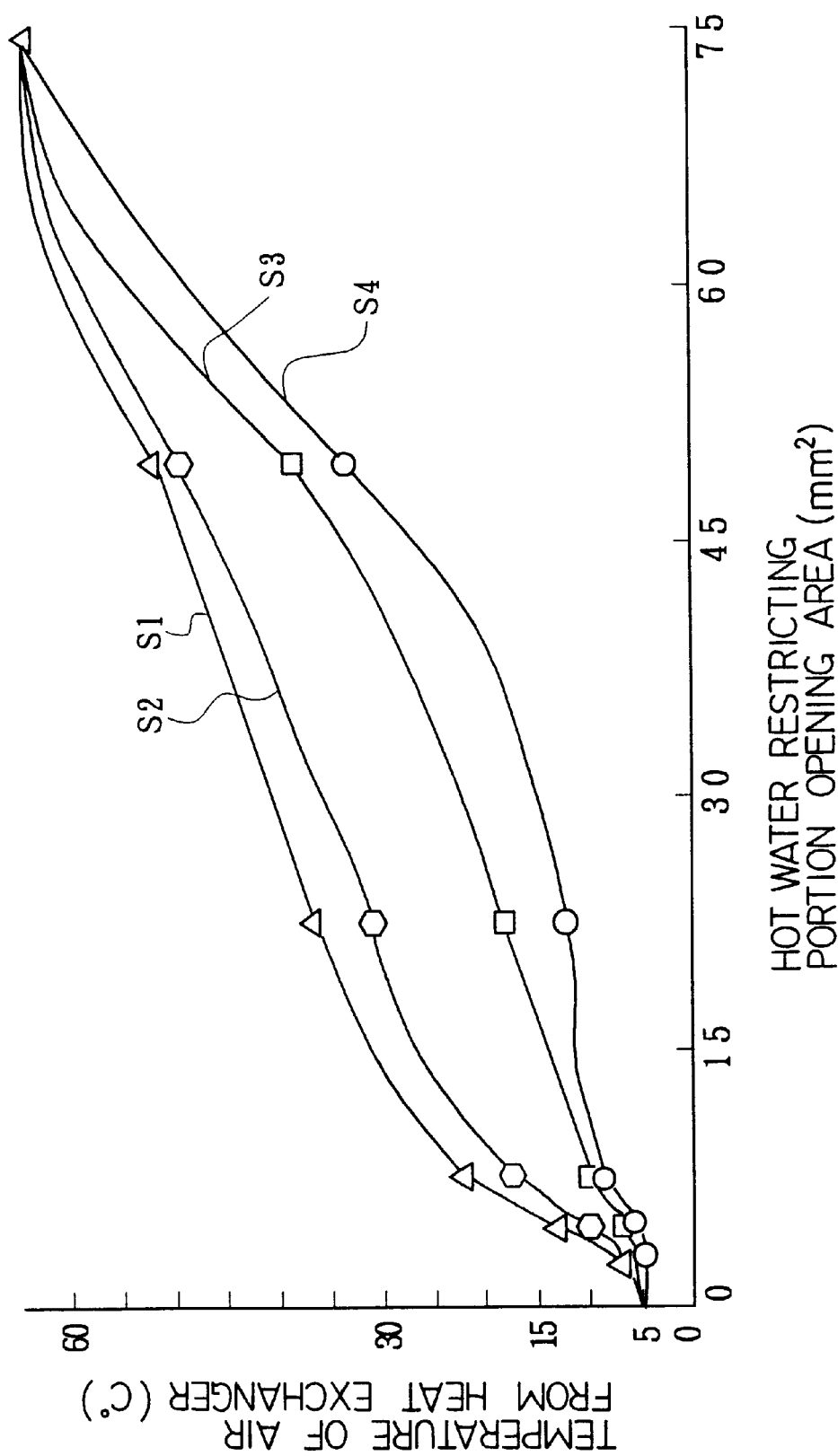
FIG. 17 is a graph showing a gain-reduction effect of temperature control by a hot-water circuit according to the eleventh embodiment.

To describe the effects according to the above-described eleventh embodiment with reference to FIG. 17, the ordinate and abscissa of FIG. 17 are identical with FIG. 8, and such experimental data generated when the engine speed is 1,500 rpm.

In FIG. 17, trace S1 shows control characteristics of a comparative example eliminating the bypass circuit 5 from the hot-water circuit. Trace S2 shows control characteristics of the hot-water circuit of FIG. 1 (the first embodiment), and indicates characteristics when the constant-differential pressure valve 6 is almost closed. Trace S3 shows control characteristics according to the eleventh embodiment, and indicates characteristics when the constant-differential pressure valve 6 again is substantially closed. Trace S4 Shows control characteristics in a case where the constant-differential pressure valve 6 has been removed from the bypass circuit 5 of the hot-water circuit and the bypass circuit 5 constantly remains open. In addition, a hot-water circuit as in 4 is also included as an embodiment according to the present invention.

To examine only the object of reducing control gain of temperature control, the characteristics of S4 become the most superior, but in the case of S4, a constant-differential pressure valve 6 is not provided in the bypass circuit 5, and so the blown-air temperature characteristics indicated in the foregoing FIG. 10 become the characteristics of A with respect to fluctuations in engine speed, and fluctuations in blown-air temperature become large.

In contrast to this, in the case of S3 according to the eleventh embodiment, the characteristics of B in FIG. 10 are obtained, and fluctuations in blown-air temperature can be reduced to a minute value with respect to fluctuations in engine speed.

That is to say, according to the eleventh embodiment, reduction of control gain of temperature control and suppression of fluctuation of blown-air temperature with respect to fluctuation in engine speed can be provided simultaneously.

Figure 18:
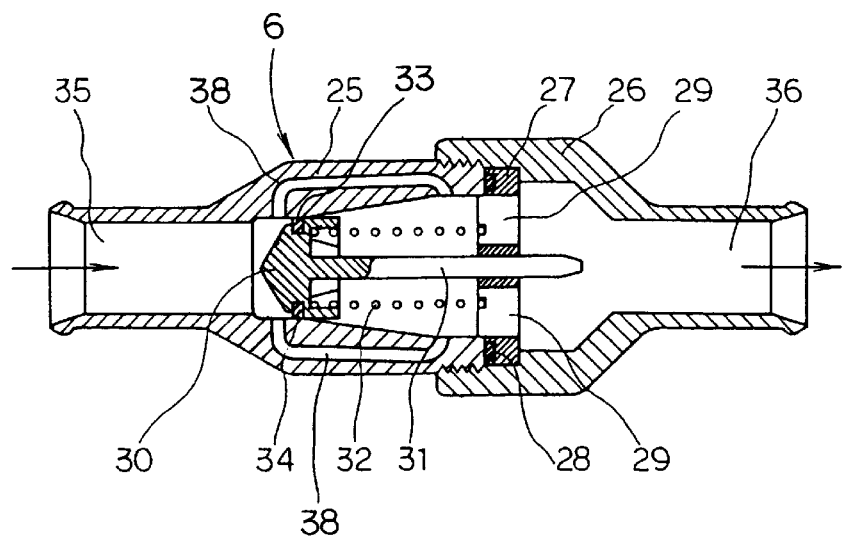
FIG. 18 is a cross-sectional view of a constant-differential pressure valve according to a twelfth embodiment of the present invention.

FIG. 18 shows a twelfth embodiment similar to that of the eleventh embodiment in which the functionality of the constantly open bypass circuit 5d of FIG. 17 is provided integrally in the interior of the constant-differential pressure valve 6. That is to say, a plurality of through-holes 38 to bypass the conical needle valve 30 and the valve seat 33 are formed in the housing 25.

Figure 19A:
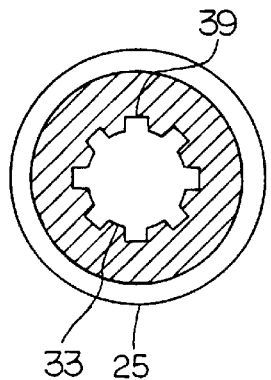
FIGS. 19A and 19B are axial and longitudinal cross-sectional views of a constant-differential pressure valve according to a thirteenth embodiment of the present invention, FIG. 19A being a cross-sectional view taken along line XIXA—XIXA of FIG. 19B.
Figure 19B:
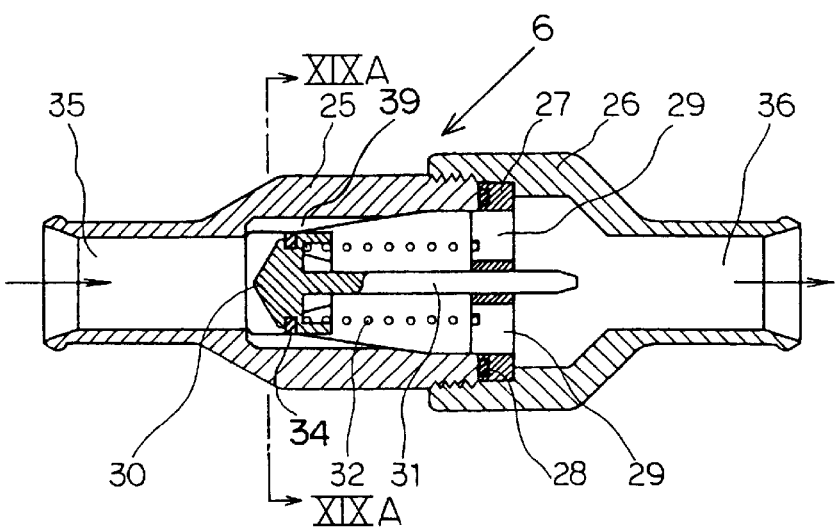
Figure 20A:
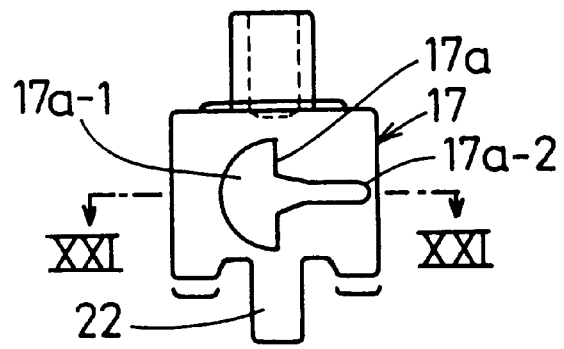
FIG. 20A shows a front view of an individual needle valve (rotor) of a flow control valve according to a fourteenth embodiment of the present invention.
Figure 20B:
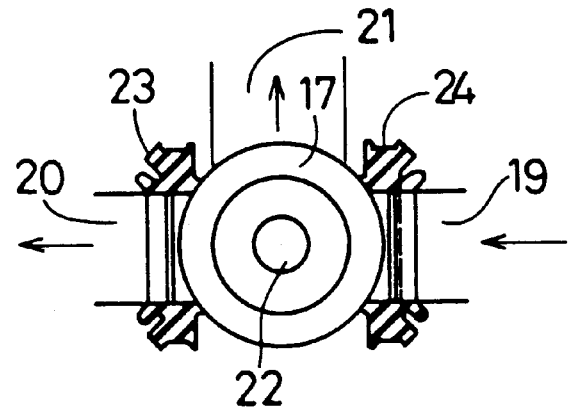
FIG. 20B is a schematic structural diagram of the needle valve and a valve housing of the flow control according to that embodiment.
Figure 25A:
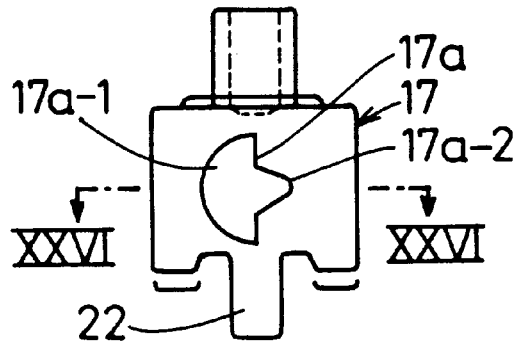
FIG. 25A is a front view of an individual needle valve (rotor) of a flow control valve according to a fifteenth embodiment of the present invention.
Figure 25B:
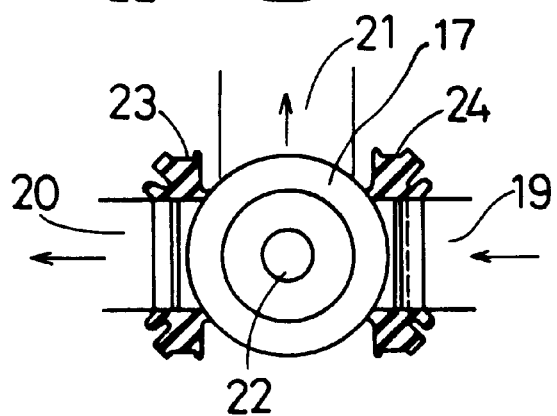
FIG. 25B is a schematic structural diagram of the needle valve and a valve housing of the flow control valve according to the fifteenth embodiment.

FIGS. 19A and 19B show a thirteenth embodiment similar to that of FIG. 18 in which a plurality of slits 39 are formed circumferentially on the valve seat 33 to provide the functionality of the bypass circuit 5d.

Additionally, as in the constant-differential pressure valve 6 of FIGS. 6A and 6B, it is also acceptable to form a plurality of through-holes 37 on the conical portion of the needle valve 30 to provide the functionality of the bypass circuit 5d.

FIGS. 20A, 20B and 21A–21H illustrate a fourteenth embodiment in which the operating range of the needle valve 17 is enlarged from the 60° range of FIGS. 5A–5G to 90°, and along with this, the configurations (i.e., the opening configurations on the circumferential surface of the needle valve 17) of the control passages 17a and 17b of the needle valve 17 are made from respective semicircular portions 17a-1 and 17b-1 and narrow-length portions 17a-2 and 17b-2 joined at center portions of the chords of these semicircular portions 17a-1 and 17b-1.

These narrow-length portions 17a-2 and 17b-2 are formed so as to become narrower moving toward the tip ends thereof (i.e., toward the right-hand sides of the drawings).

Figure 16:
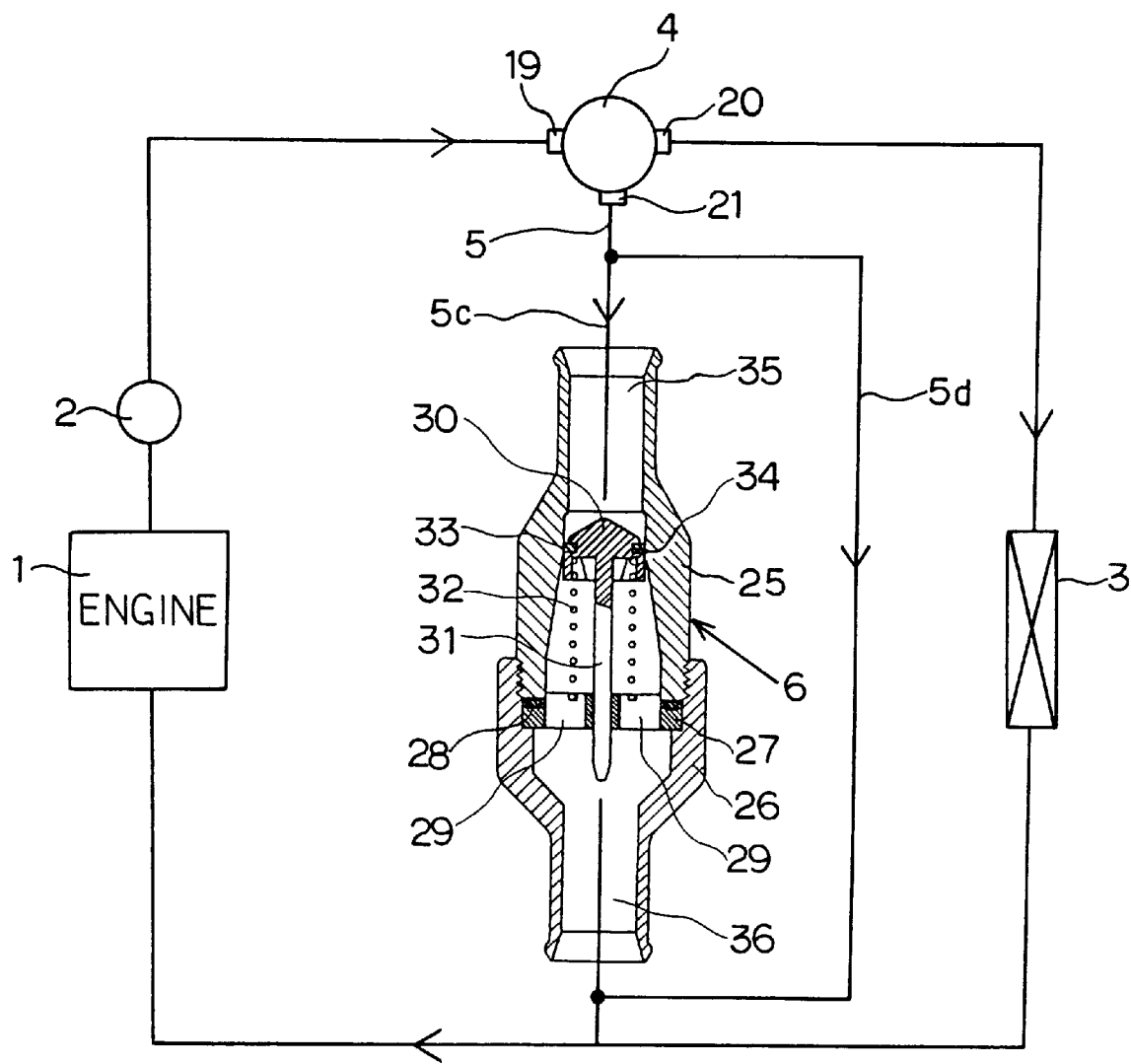
FIG. 16 is a hot-water circuit diagram illustrating an eleventh embodiment according to the present invention.
Figure 22:
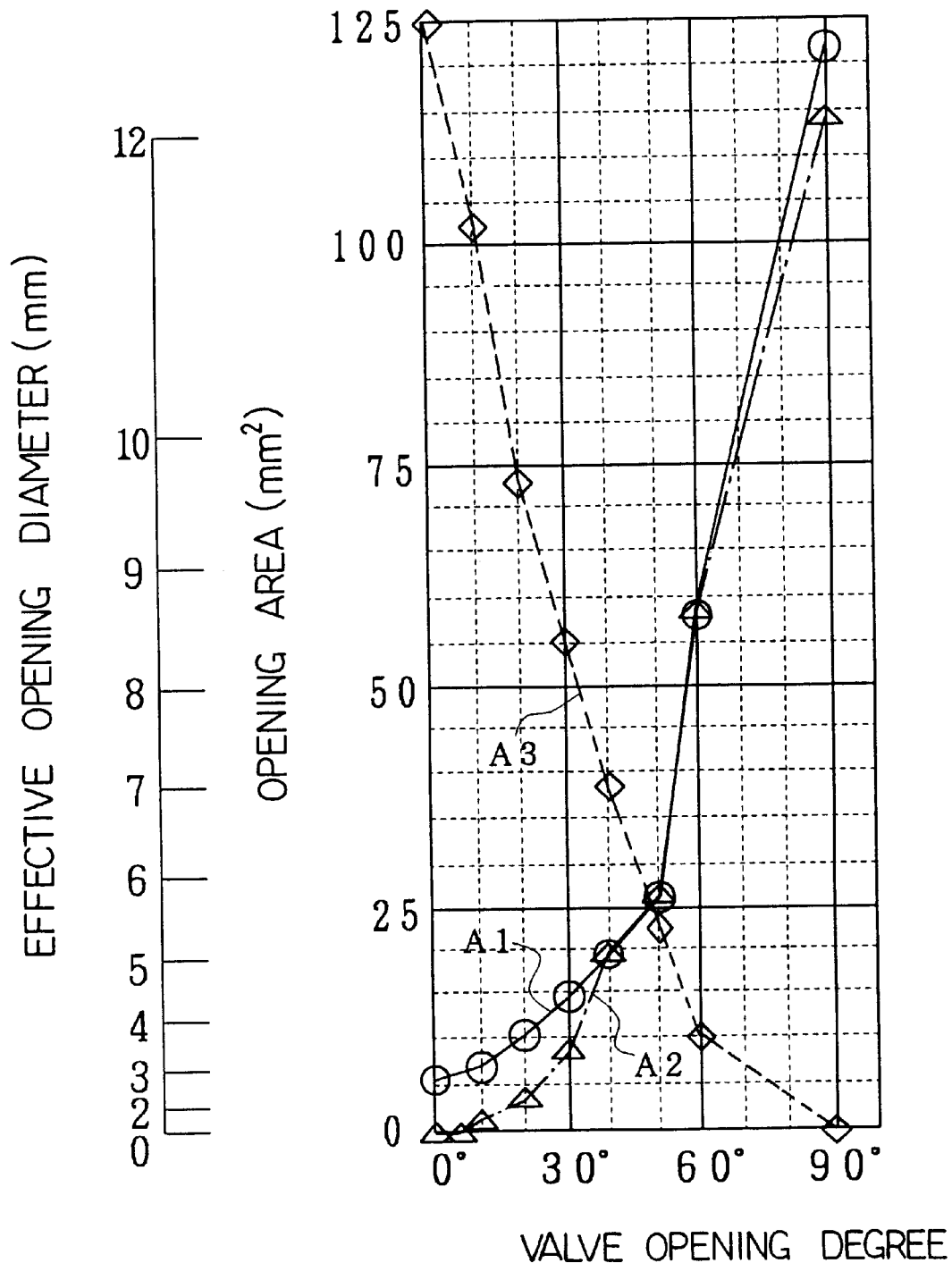
FIG. 22 is a graph showing degree of opening characteristics of a needle valve (rotor) of the flow control valve according to the fourteenth embodiment.

FIG. 22 indicates degree of opening characteristics of the needle valve 17 having control passages 17a and 17b with the open configuration indicated in FIG. 22, and corresponds to the above-mentioned FIGS. 8 and 16.

Figure 23:
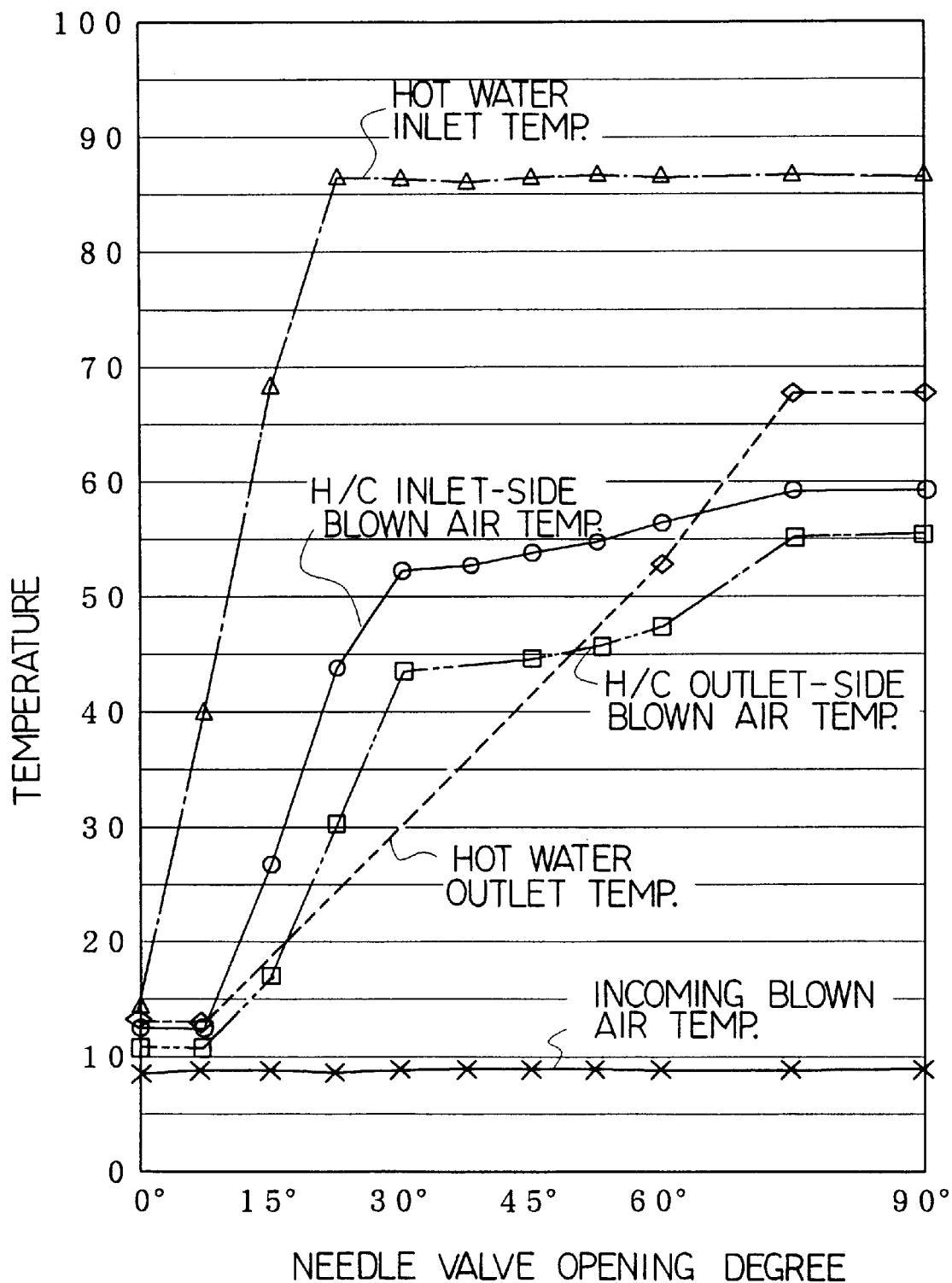
FIG. 23 is a graph showing control characteristics of blown-air temperature using the flow control valve according to the fourteenth embodiment.

FIG. 23 indicates temperature-control characteristics of the fourteenth embodiment employing the needle valve 17 indicated in the foregoing FIGS. 20A, 20B and 21A–21H, and indicates measurements from experimentation actually performed by the inventors.

The vertical axis of FIG. 23 is taken to be the temperature (°C.) of the respective areas, and the horizontal axis is taken to be the degree of opening of the needle valve 17.

Figure 24:
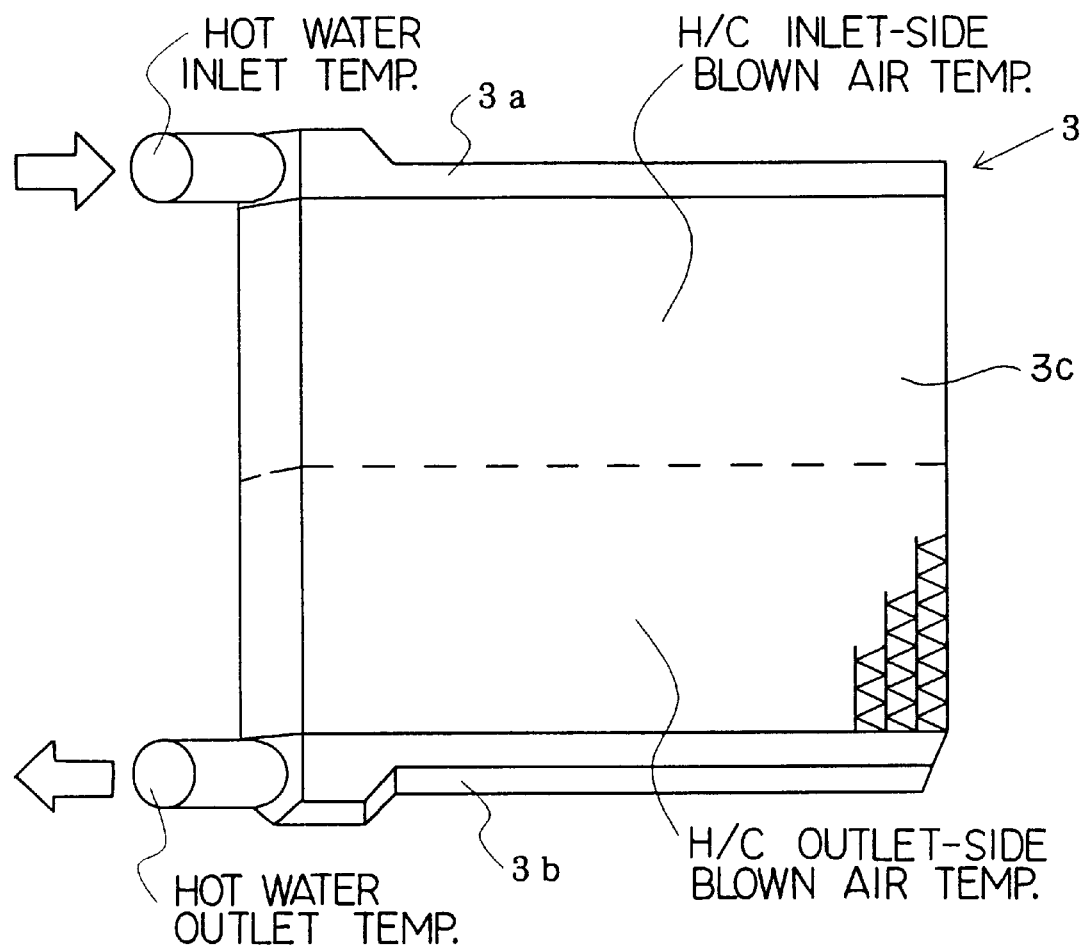
FIG. 24 is a heat exchanger perspective view showing the temperatures indicated in the graph of FIG. 23.

Accordingly, the hot-water inlet temperature in FIG. 23 is the temperature of hot water flowing into the hot-water inlet-side tank 3a of the heat exchanger 3, and the hot-water outlet temperature is the temperature of hot water flowing out from the hot-water outlet-side tank 3b of the heat exchanger 3. Additionally, the H/C inlet-side blown-air temperature is the blown-air temperature of the hot-water inlet-side area (i.e., the upper half of FIG. 24) at the core portion 3c of the heat exchanger for heater use 3, and the H/C outlet-side blown-air temperature is the blown-air temperature of the hot-water outlet-side area (i.e., the lower half of FIG. 24) at the core portion 3c of the heat exchanger 3.

Moreover, the blown-air temperature of FIG. 23 is the temperature of air blown to the heat exchanger 3. As is understood from the experimental results of FIG. 23, in a device according to the fourteenth embodiment, the slope of a blown-air temperature characteristic curve in the temperature-control range of 15° C. to 50° C. which typically utilized in automotive air-conditioning systems is comparatively high. Thus, when the slope of a characteristic curve in a temperature-control range typically utilized is high, the amount of change of blown-air temperature with respect to change in degree of opening becomes large during actual use, and accurate and stable control of passenger compartment temperature becomes difficult.

In the foregoing fourteenth embodiment, according to experimentation and research by the inventors, it has been determined that the reason why the slope of a control characteristic curve of a temperature-control range which is typically utilized becomes high is that as the degree of opening of the needle valve 17 increases from a degree of opening of zero, the restriction opening area A1 of the hot-water inlet pipe 19 and the restriction opening area A2 of the hot-water outlet pipe 20 continuously increase together (see FIG. 23), and as a result of this the amount of hot water flowing into the heat exchanger 3 increases continuously.

FIGS. 25A, 25B, 26A–26G, 27 and 28 illustrate a fifteenth embodiment which improves temperature-control characteristics of the fourteenth embodiment by modifying the hole configuration of the control passages 17a and 17b of the needle valve 17.

As shown in FIGS. 25A, 25B and 26A–26G, the length of the narrow-length portion 17a-2 of the control passage 17a of the needle valve 17 which opposes the hot-water inlet pipe 19 is made shorter than in the fourteenth embodiment. In specific terms, shortening is done to the extent that this narrow-length portion 17a-2 does not open to the hot-water inlet pipe 19 in a predetermined angular (degree of opening) range where the degree of opening of the needle valve 17 is from 0° to 20°.

In substitution thereof, a small hole 17a-3 of small circular configuration approximately 2 mm. in diameter is provided, so that the small hole 17a-3 is the only part of the control passage 17a which opens to the hot-water inlet pipe 19 in a predetermined range of degree of opening of the needle valve 17 from zero (a range of 0° to 20° in the example of FIGS. 26A–26G). Consequently, a uniform opening surface area is maintained by the small hole 17a-3 within this predetermined range.

Accordingly, when the degree of opening of the needle valve 17 exceeds 20°, the narrow-length portion 17a-2 of the control passage 7a opens to the hot-water inlet pipe 19, and when the valve degree of opening further increases, the semicircular portion 17b-1 opens to the hot-water inlet pipe 19 so that the opening surface area increases suddenly.

Meanwhile, the control passage 17b is of identical configuration as the corresponding component in the fourteenth embodiment, and has a semicircular portion 17b-1 and a narrow-length portion 17b-2 joined at center portion of the chord of this semicircular portion 17b-1.

The foregoing two narrow-length portions 17a-2 and 17b-2 are structured to become narrower (i.e., the opening surface areas become smaller) moving away from the tip ends thereof.

Accordingly, when the needle valve 17 has been operated by a minute amount from an opening degree of zero (e.g., to an opening degree of 10° in the example of FIGS. 26A–26G), the control passage 17b opens to the hot-water outlet pipe 20, the opening surface area to the bypass outlet pipe 21 decreases gradually as the degree of opening of the needle valve 17 increases thereafter, and when the degree of opening of the needle valve 17 reaches the maximum opening degree (i.e., 90° in the example of FIG. 27), or, in other words, when the needle valve 17 is set at a maximum heating position, the opening surface area of the control passage 17b and the bypass outlet pipe 21 becomes zero, and hot-water outflow to the bypass circuit 5 side is prevented. Simultaneously, the control passage 17a and the control passage 17b are respectively open with maximum opening surface areas to the hot-water inlet pipe 19 and the hot-water outlet pipe 20, and so maximum heating capacity can be assured.

Figure 27:
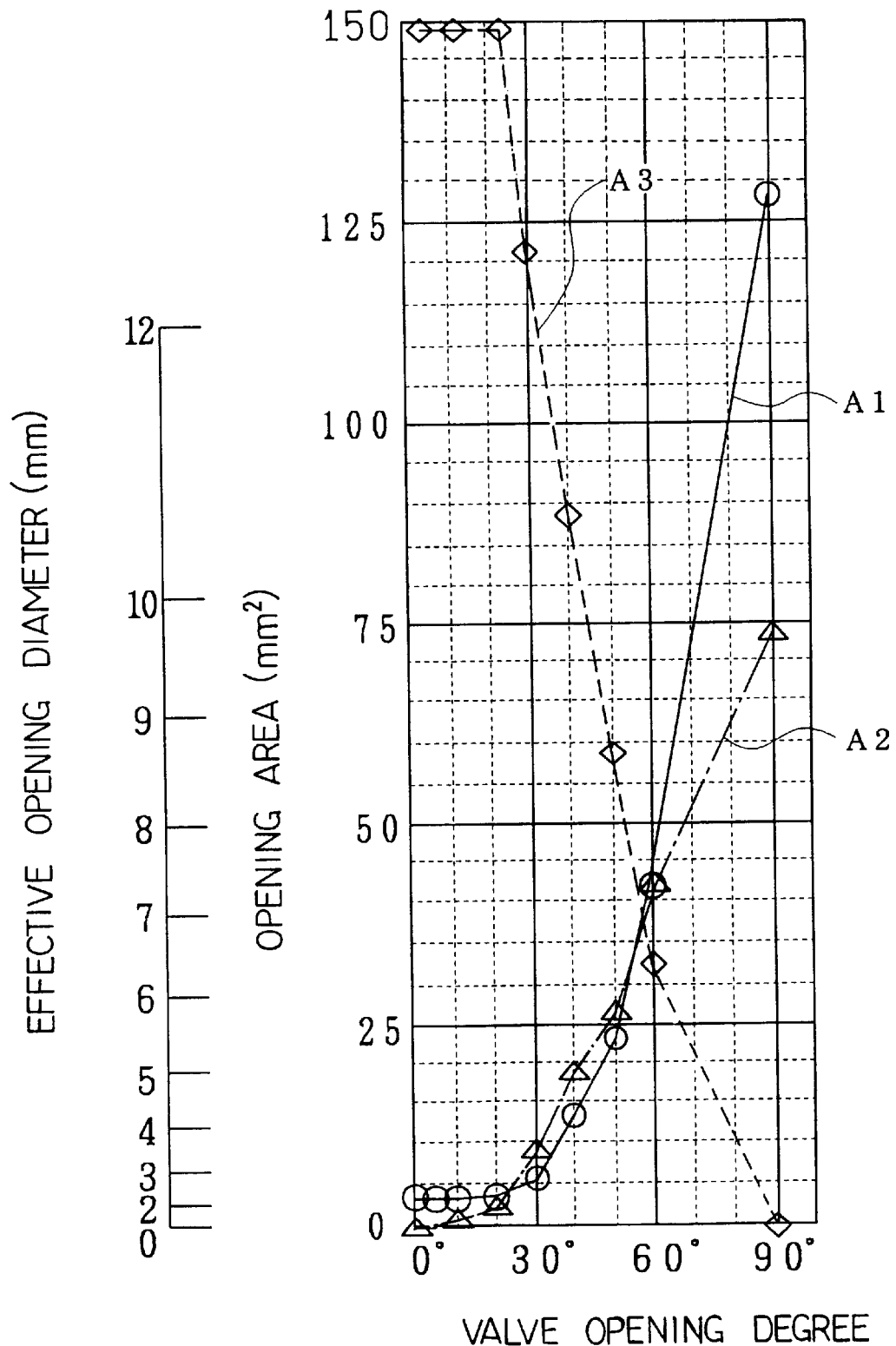
FIG. 27 is a graph showing degree of opening characteristics of a needle valve (rotor) of the flow control valve according to the fifteenth embodiment.

FIG. 27 shows a situation wherein the opening surface area A1 of the control passage 17a and the hot-water inlet pipe 19, the opening surface area A2 of the control passage 17b and the hot-water outlet pipe 20, and the opening surface area A3 of the control passage 17b and the bypass outlet pipe 21 are changed by the degree of valve opening. The drawing corresponds to the above-mentioned FIGS. 7, 15, and 22.

Figure 28:
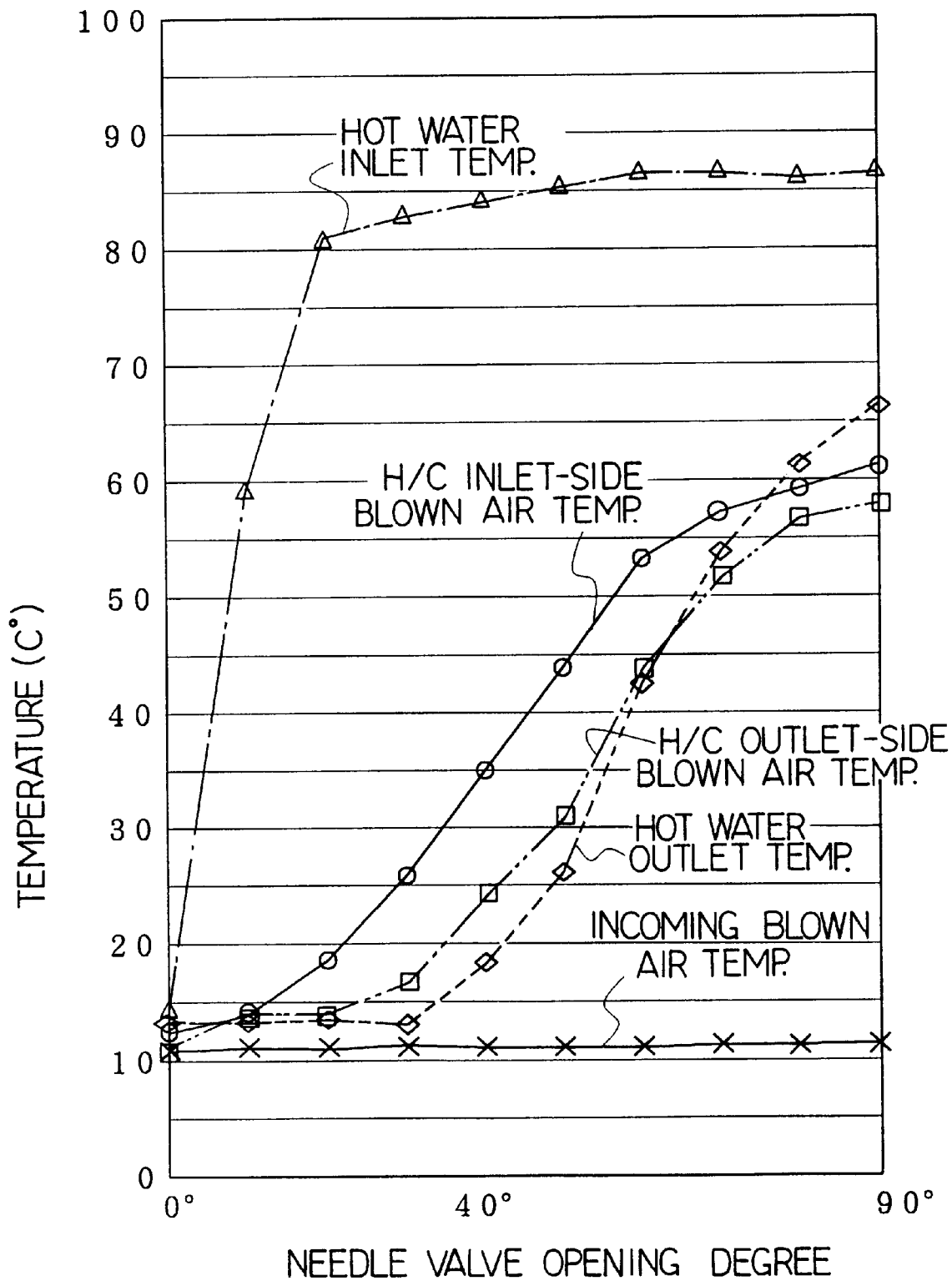
FIG. 28 is a graph showing control characteristics of blown-air temperature using the flow control valve according to the fifteenth embodiment.
Figure 29A:
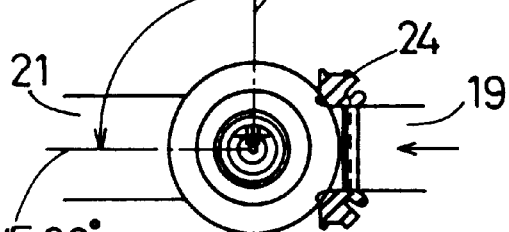
FIGS. 29A and 29B are schematic assembly structural diagrams of a needle valve and a valve housing of a flow control valve according to a sixteenth embodiment of the present invention.
Figure 29B:
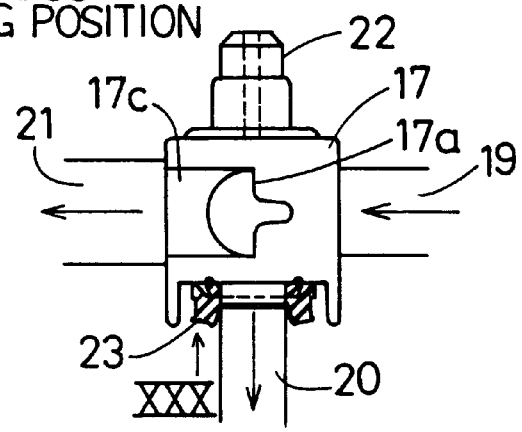

FIG. 28 shows temperature-control characteristics according to the foregoing fifteenth embodiment. As described above, the opening surface area A1 of the hot-water inlet pipe 19 and the control passage 17a of the needle valve 17 is maintained by the small hole 17a-3 at a uniform opening surface area in a predetermined range of the degree of opening of the needle valve 17 from zero, and any increase in the amount of hot water flowing into the heat exchanger 3 is suppressed, so in actual practice, the control characteristic curve of the blown-air temperature can have a significantly smaller slope than the corresponding characteristic curve of FIGS. 25A and 25B in the typically utilized temperature region of 15° C. to 50° C.

For this reason, the ratio of change in blown-air temperature is markedly reduced with respect to valve opening degree, and regulation of blown-air temperature is facilitated.

FIGS. 29A, 29B and 30A–30G show a sixteenth embodiment in which temperature control characteristics of small-slope (dormant) characteristics identical to the foregoing fifteenth embodiment are obtained by a different method. According to this present embodiment, a hot-water inlet pipe 19 and a seal member 24 are disposed on a side of a circumferential surface of the needle valve 17, and a bypass outlet pipe 21 is disposed at an opposite position with respect to the hot-water inlet pipe 19 and seal member 24.

Accordingly, a hot-water outlet pipe 20 and a seal member 23 are disposed on a bottom side of the needle valve 17. In addition to a semicircular portion 17a-1 and a narrow-length portion 17a-2, a small hole 17a-3 is provided in a control passage 17a formed in the needle valve 17, so that the opening surface area A1 of the hot-water inlet pipe 19 into which hot water flows from the engine 1 is thereby maintained by the small hole 17a-3 at a uniform opening surface area in a predetermined range of the degree of opening of the needle valve 17 from zero, similarly to the fifteenth embodiment. An increase in the amount of hot water flowing into the heat exchanger 3 when the valve degree of opening is small can thereby be suppressed.

Meanwhile, as shown in FIG. 30A, the opening surface area A2 of the hot-water outlet pipe 20 (connected to an inlet of the heat exchanger 3) disposed on the bottom side of the needle valve 17 is composed of a control passage 17b formed on the bottom of the needle valve 17 and a restricting hole portion 23a formed in the seal member 23 of the valve housing 8 side to exhibit changes similarly to the foregoing fifteenth embodiment.

That is to say, when the degree of opening of the needle valve 17 is zero, the opening surface area A2 of the hot-water outlet pipe 20 becomes zero, and when the needle valve 17 has been opened a minute amount (e.g., a degree of opening of 10° in the example of FIG. 30B) from a fully closed state, the hot-water outlet pipe 20 opens, and the opening surface area A2 of the hot-water outlet pipe 20 increases as the degree of opening of the needle valve 17 increases thereafter.

Figure 31A:
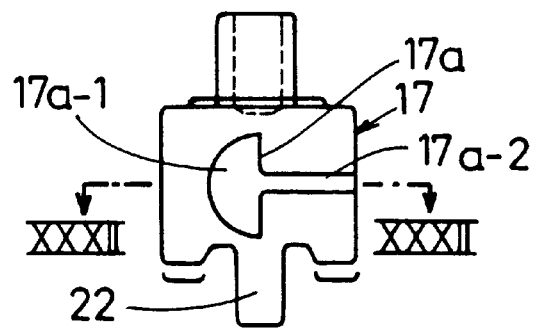
FIG. 31A is a front view of an individual needle valve (rotor) of a flow control valve according to a seventeenth embodiment of the present invention.
Figure 31B:
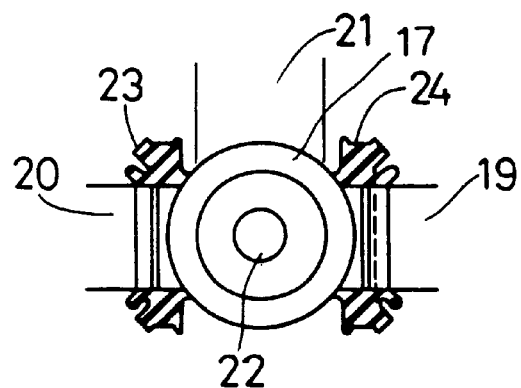
FIG. 31B is a schematic structural diagram of the needle valve and a valve housing of the flow control valve according to that embodiment.

In the example of FIG. 31A, the control passage 17b formed on the bottom of the needle valve 17 has two substantially comma-shaped holes, and additionally the restricting hole portion 23a of the seal member 23 is substantially oblong with a center portion of narrowed width.

Additionally, a control passage 17v is formed continuously at a left-hand side of the control passage 17a of the needle valve 17 so that an opening surface area A3 of the bypass outlet pipe 21 exhibits changes similar to the fifteenth embodiment with respect to the valve degree of opening due to this control passage 17c.

According to the sixteenth embodiment, favorable temperature-control characteristics similar to the fifteenth embodiment and as indicated in FIG. 29 are obtained by having the above-described structure.

FIGS. 31A, 31B and 32A–32G indicate a seventeenth embodiment in which the small hole 17a-3 according to the foregoing fifteenth embodiment is eliminated in favor of a narrow-length portion 17a-2 of the control passage 17a having a uniform open width which has a length of a predetermined value or more.

Because of this, as shown in FIG. 32B, the opening surface area A1 of the hot-water inlet pipe 19 is maintained uniformly by the foregoing narrow-length portion 17a-2 during the interval until the degree of opening of the needle valve 17 reaches 30°.

Other features are similar to corresponding parts of the fifteenth embodiment.

It has been discovered that the constant differential pressure valve 6 absorbs variations in the rotational speed of the engine; however, to absorb variations in the supply pressure of hot water according to a wide range of variations in the rotational speed of the engine, it may be necessary to enlarge the operating stroke of the valve 6, to greatly vary the hot water flow quantity, or both. Therefore, the usable range of the spring 32, i.e., the permissible amount of deformation of the spring 32, must be enlarged and, as a result, self-vibration of the spring 32 may be induced, thereby resulting in the generation of noise.

A notable feature of an eighteenth embodiment of the present invention which can avoid such effects is the specific structure of the of the three restricting portions $A_1$, $A_2$ and $A_3$ formed between the needle valve 17 and valve housing 18 of the flow control valve 4. As shown in the foregoing FIGS. 1 and 2, a first restricting portion $A_1$ is formed between the hot-water inlet pipe 19 and the inlet sides of the control passages 17a and 17b of the needle valve 17, a second restricting portion $A_2$ is formed between the hot-water outlet pipe 20 and the outlet sides of the control passages 17a and 17b of the needle valve 17, and a third restricting portion $A_3$ is formed between the bypass outlet pipe 21 and the outlet sides of the control passages 17a and 17b of the needle valve 17.

Accordingly, the foregoing first and second restricting portions $A_1$ and $A_2$ are structured so that a flow constant C thereof is diminished with a predetermined slope $\theta$ with respect to an increase in the amount of hot-water flow Vw.

Meanwhile, the third restricting portion $A_3$ is structured so that a flow constant C thereof is maintained substantially uniformly with respect to an increase in the amount of hot-water flow Vw.

Herein, the relationship between amount of hot-water flow Vw passing through the restricting portions $A_1$–$A_3$ and flow constant C is indicated in Equation 1 below.

$$Vw = C\,°A\,°\Delta P^{1/2} \qquad (1)$$

Herein, A is the passage cross-sectional area of the restricting portions $A_1$ through $A_3$, and $\Delta P$ is the pressure differential of before and after the restricting portions $A_1$ through $A_3$.

Figure 33:
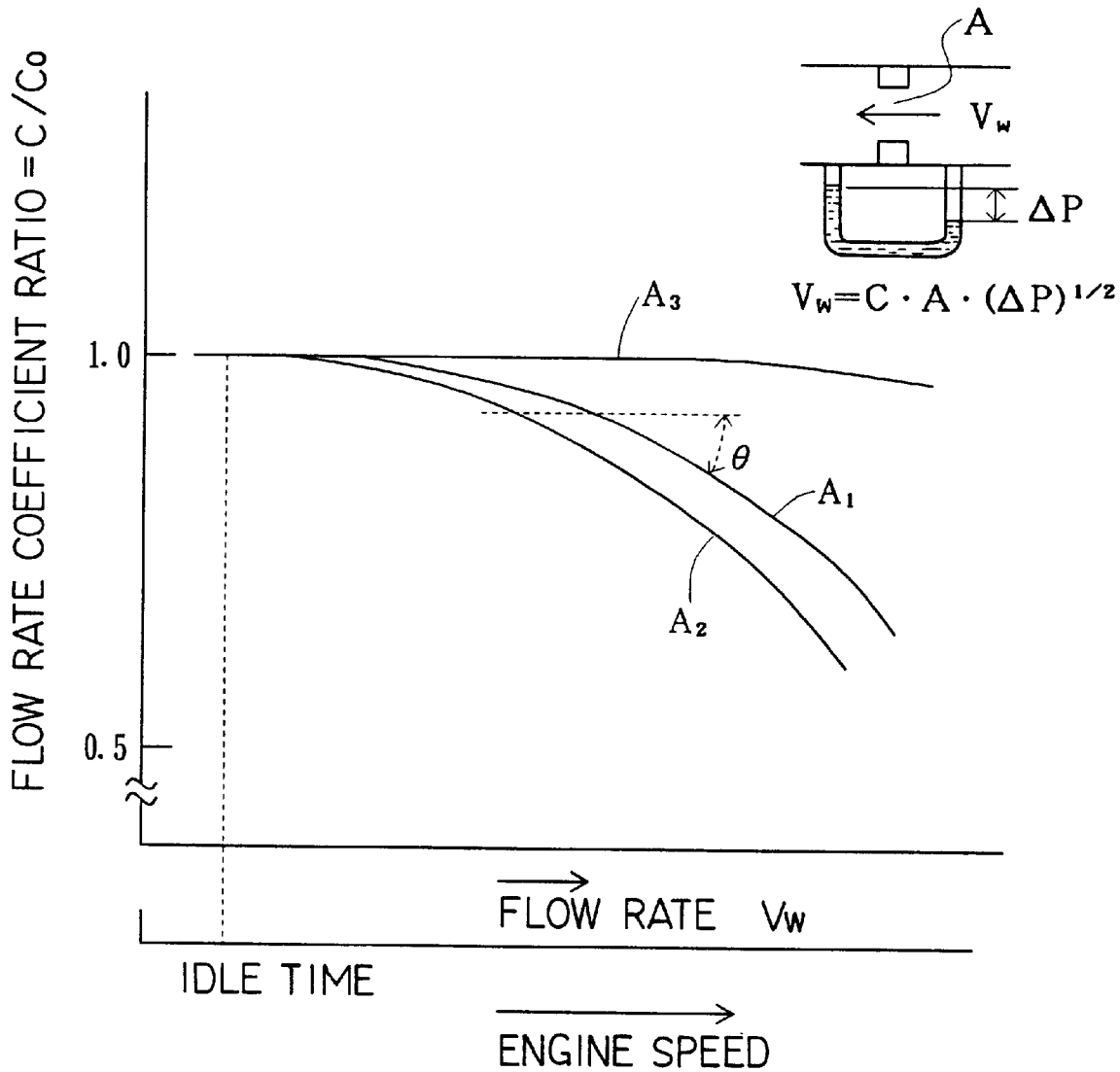
FIG. 33 is a graph indicating a relationship between flow constant and hot-water flow in first through third restricting portions in a flow control valve according to an eighteenth embodiment.

The horizontal axis of FIG. 33 is taken to be the amount of hot-water flow Vw passing through the restricting portions $A_1$ through $A_3$ and engine speed of the automobile, and because the water pump for hot-water circulation use 2 is driven by the engine 1, the amount of hot-water flow Vw increases proportional to increase in engine speed. Accordingly, the vertical axis takes the flow constant during idling of engine speed to be $C_0$, and is taken to be a ratio of flow constant C of desired amount of flow with respect to this $C_0$.

The reason that structure of the above-described first and second restricting portions $A_1$ and $A_2$ is such that a flow constant C thereof is diminished with a predetermined slope $\theta$ with respect to an increase in the amount of hot-water flow Vw whereas the structure of the third restricting portion $A_3$ is such that a flow constant C thereof is maintained substantially uniform with respect to an increase in the amount of hot-water flow Vw is that, with respect to an increase in speed of the engine 1 (and correspondingly, an increase in the speed of the water pump 2), the more speed is increased, the more the amount of hot-water flow is restricted at the first and second restricting portions $A_1$ and $A_2$, and the more the amount of hot-water flow which is allowed to escape to the bypass circuit 5 side is caused to increase.

To establish the flow constant C of the first through third restricting portions $A_1$–$A_3$ in the relationship indicated in FIG. 33, it is sufficient to form, for example, the needle valve 17 and valve housing 18 in the configuration shown in FIGS. 34A–34C and 35A–35G. FIGS. 35A–35G are development diagram of the needle valve 17 shown in FIGS. 34A–34C.

That is to say, orifice configurations which suddenly restrict the hot-water passages are formed at locations of the needle valve 17 corresponding to the first and second restricting portions $A_1$ and $A_2$ by forming concave grooves 17c, 17d, and 17e in the perimeter of the passages (holes) of the inlet side and outlet side of the control passages 17a and 17b of the needle valve 17.

Herein, the reason for forming the concave grooves 17c, 17d, and 17e is to form convexities which protrude into the flow of hot water in the perimeter of the first and second restricting portions $A_1$ and $A_2$ and to increase the effect of the orifice configurations which suddenly restrict the hot-water passages.

Figure 34A:
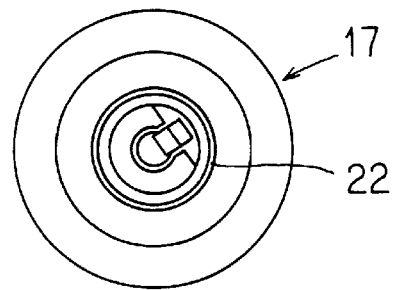
FIGS. 34A–34C are drawings indicating a specific mode of first through third restricting portions in the eighteenth embodiment, where
Figure 34B:
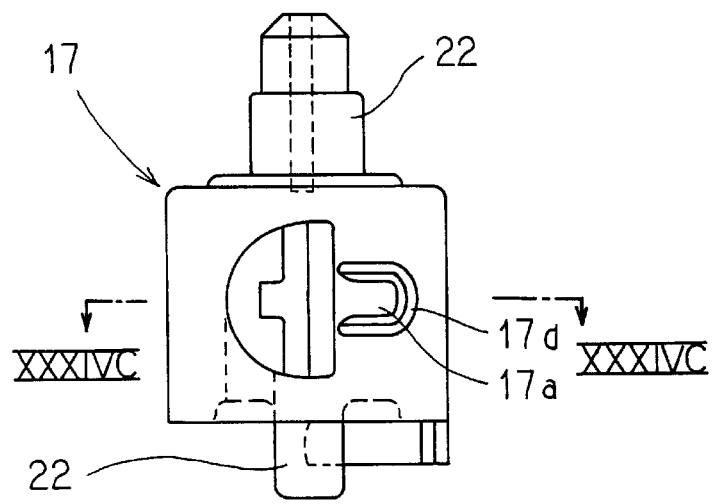
Figure 34C:
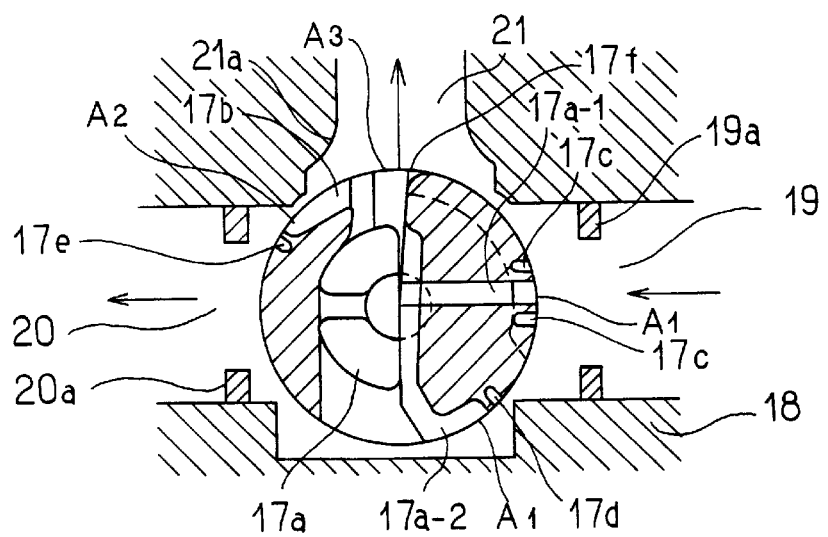

In the example of FIGS. 34A–34C, the control passage 17a which is communicated with the hot-water inlet pipe 19 has a branched structure on a small-hole portion 17a-1 and a large-hole portion 17a-2 composed of a circular-hole configuration which corresponds to $\Phi 2$, and for this reason the concave grooves 17c and 17d are formed at two locations on the control valve 17a side and the first restricting portion A1 is made up of restricting portions of two locations.

However, the foregoing concave grooves 17c, 17d, and 17e are not essential to formation of an orifice configuration, and an orifice configuration can be formed merely by forming a sharp edge in the perimeter of the first and second restricting portions $A_1$ and $A_2$.

In the example of FIGS. 34A–34C, convexities 19a and 20a which suddenly restrict hot-water passages are provided in locations (valve housing 18 side location) of the hot-water inlet pipe 19 and hot-water outlet pipe 20 side corresponding to the first and second restricting portions $A_1$ and $A_2$, and an orifice configuration is formed on the valve housing 18 side as well. These convexities 19a and 20a can be formed by the above-described elastic seal members (gaskets) 23 and 24, or can also be structured by convexities formed integrally with the valve housing 18 of resin fabrication.

Meanwhile, a chamfered portion (smooth arc-configuration portion) 17f is formed on an edge at a location of the needle valve 17 which makes up the third restricting portion $A_3$, forming a nozzle configuration which causes the hot-water passage to be gently changed. Additionally, a chamfered portion (smooth arc-configuration portion) 21a is also formed on a location of the bypass outlet pipe 21 side corresponding to the third restricting portion $A_3$, forming a nozzle configuration which causes the hot-water passage to be gently changed.

Nevertheless, according to this embodiment of the present invention, as shown in the above-described FIG. 33, the structure is such that flow constant C of the first restricting portion $A_1$ corresponding to the hot-water inlet pipe 19 and the second restricting portion $A_2$ corresponding to the hot-water outlet pipe 20 is diminished at a predetermined slope $\theta$ with respect to an increased amount of hot-water flow Vw, and meanwhile the structure is such that flow constant C of the third restricting portion $A_3$ corresponding to the bypass outlet pipe 21 is maintained substantially uniformly with respect to increase in amount of hot-water flow Vw, and so with respect to increase in speed of the engine 1 (i.e., speed of the water pump 2), the more speed is increased, the more the amount of hot-water flow is restricted at the first and second restricting portions $A_1$ and $A_2$, and the more the amount of hot-water flow which is allowed to escape to the bypass circuit 5 side can be caused to increase.

In this way, fluctuation in heat-exchanger hot-water flow due to change in hot-water supply pressure from the engine 1 can be absorbed to a considerable extent by characteristics of these restricting portions $A_1$ through $A_3$ themselves by varying the slope with respect to an increase in the amount of hot-water flow Vw with the flow constant C of the first and second restricting portions $A_1$ and $A_2$ and the flow constant of the third restricting portion $A_3$.

Consequently, the usage range (amount of flexion) of the spring 32 in the constant-differential pressure valve 6 can be caused to be reduced, and occurrence of self-induced vibration of the spring 32 can be suppressed.

Figure 36:
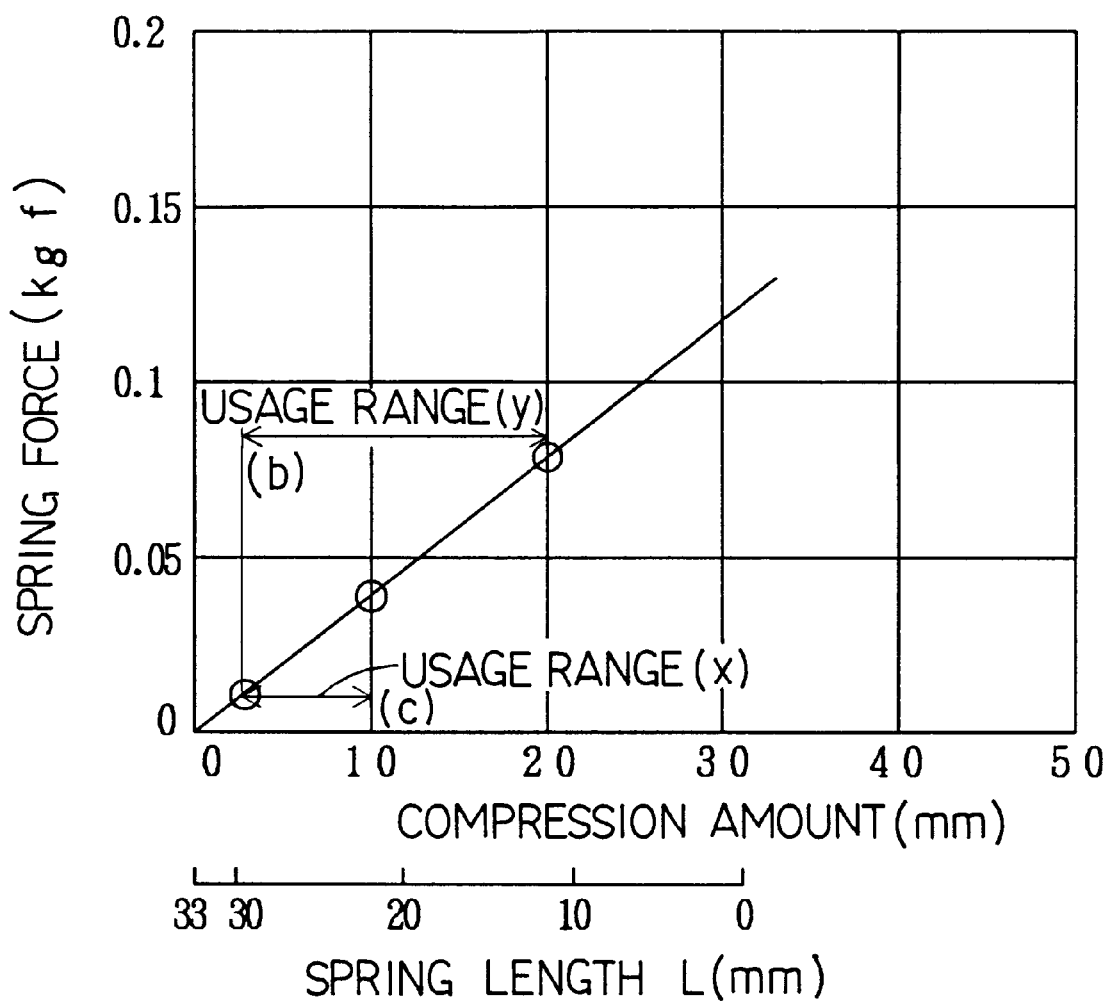
FIG. 36 is a characteristic diagram indicating spring characteristics in a constant-differential pressure valve according to the embodiment.

FIG. 36 takes spring force of the spring 32 as the vertical axis, and takes amount of flexion and spring length L of the spring 32 as the horizontal axis. In the graph, (b) indicates a spring usage range in a comparative example wherein slopes of flow constants of the first through third restricting portions $A_1$ through $A_3$ are caused to be identical, and (c) indicates a spring usage range in a device according to the present embodiment of the invention wherein slopes of flow constants of the first through third restricting portions $A_1$ through $A_3$ have been varied.

As is understood from comparison of lines (b) and (c), according to the present invention, the usage range (amount of flexion) of the spring 32 can be reduced to one-half or less in comparison with the device of the comparative example.

Figure 37:
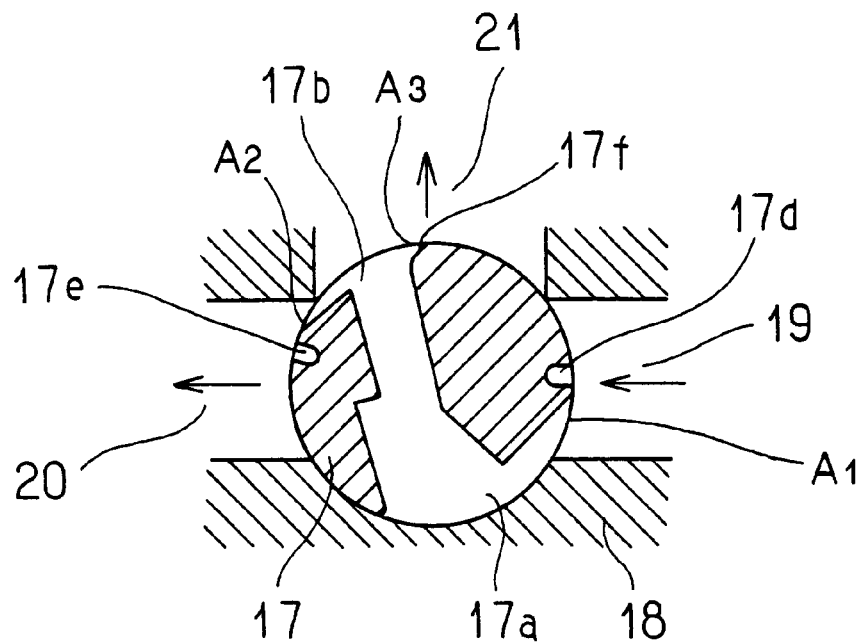
FIG. 37 is a schematic cross-sectional view showing a nineteenth embodiment of a flow control valve according to the present invention.

According to the eighteenth embodiment, a configuration change to form an orifice configuration and a nozzle configuration on both the needle valve 17 side and the valve housing 18 side has been added, as shown in FIGS. 34A–34C, but according to a nineteenth embodiment, as shown in FIG. 37, concave grooves 17d and 17e are provided on the portions of the first and second restricting portions $A_1$ and $A_2$ of the needle valve 17 and an orifice configuration is formed, and along with this, a chamfered portion 17f is formed on the third restricting portion $A_3$ portion and a nozzle configuration is formed, and convexities 19a and 20a and a chamfered portion 21a are not formed on the valve housing 18 side. Even when structured in this way, the slopes of the flow constant C can be varied at the first and second restricting portions $A_1$ and $A_2$ and the third restricting portion $A_3$.

Figure 38:
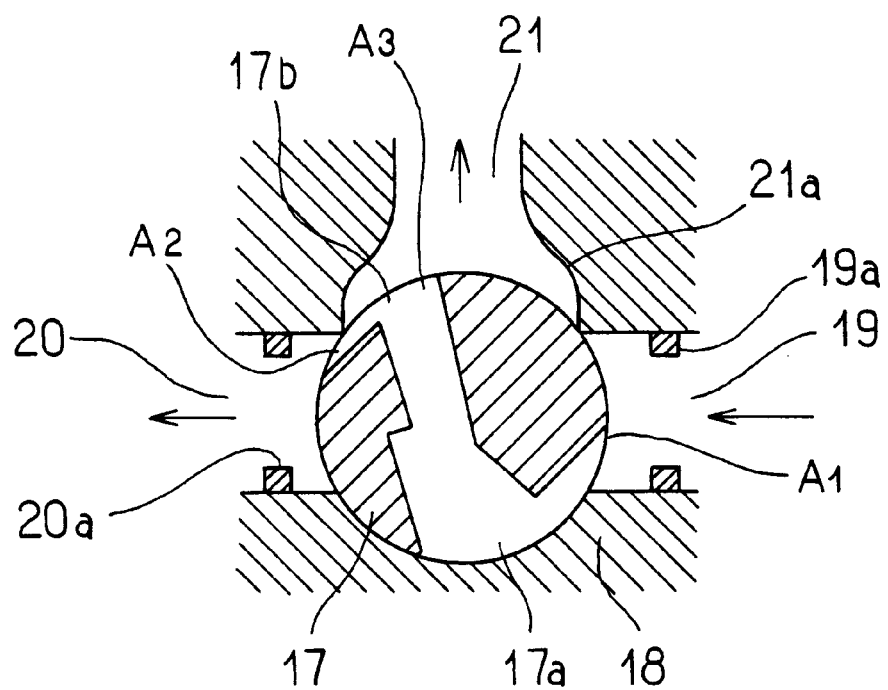
FIG. 38 is a schematic cross-sectional view showing a twentieth embodiment of a flow control valve according to the present invention.

A twentieth embodiment is a reverse of the foregoing second embodiment, and as shown in FIG. 38, is a device wherein convexities 19a and 20a and a chamfered portion 21a are formed on the valve housing 18 side, and concave grooves 17d and 17e and a chamfered portion 17f are not formed on the needle valve 17 side.

Even when structured in this way, the slopes of the flow constant C can be varied at the first and second restricting portions $A_1$ and $A_2$ and the third restricting portion $A_3$.

As is understood from the foregoing eighteenth through twentieth embodiments, it is acceptable to provide an orifice configuration and nozzle configuration to vary the slopes of the flow constant C of the first through third restricting portions $A_1$–$A_3$ at a respective restricting portion on at least one of the needle valve 17 side or valve housing 18 side.

The above-described eighteenth through twentieth embodiments may be used in the hot-water circuits shown in FIGS. 14A–14E. When used in those circuits, the differential of the slopes of the flow constant C of the first through third restricting portions $A_1$–$A_3$ is enlarged to a maximum, and a change in heat-exchanger hot water flow based on a change in hot water supply pressure due to fluctuations in engine speed is absorbed to an extent which does not impede heater feeling due to this differential in the slopes of the flow constant C. Additionally, use of the above embodiments in the circuits of FIGS. 14A–14E can provide the above-described gain reduction effect as well as prevention of valve passage obstruction by foreign matter such as casting sand and the like.

Furthermore, according to the above-described embodiments, examples wherein the flow control valve 4, constant-differential pressure valve 6, and servomotor 16 in FIG. 1 have been structured respectively independently with respect to the heat exchanger 3 have been illustrated, but it is also acceptable to provide improvement in assembly ease and compactness of the required volume of the heat-exchanger portion by structuring the constant-differential pressure valve 6 and servomotor 16 integrally in the flow control valve 4, and moreover, integrating this flow control valve 4 with the heat exchanger 3 via a pipe member having rigidity, and thereafter assembling this integral-structure article in a vent duct (heater case) 8.

Additionally, the present embodiment is not exclusively a hot-water type heater for automotive use, but may of course be utilized also in a hot-water type heater for household use or the like.

Although the present invention has been fully described in connection with the preferred embodiments thereof with respect to the accompanying drawings, it is to be noted that various changes and modifications will become apparent to those skilled in the art. Such changes and modifications are to be understood as being included within the scope of the present invention as defined by the appended claims.

What is claimed is:

1. A flow control valve for controlling fluid flow from a fluid supply source to a heat exchanger, said valve comprising:

a valve housing having a fluid inlet connectable to one of a fluid discharge port of said fluid supply source and a fluid outlet port of said heat exchanger, a fluid outlet connectable to one of a fluid intake port of said heat exchanger and a fluid intake port of said fluid supply source, a communicating path between said fluid inlet and said fluid outlet, a bypass port connectable to said communicating path and a bypass path bypassing said heat exchanger;

flow control means, disposed in said valve housing, for selectively controlling opening areas of said fluid inlet, said fluid outlet and said bypass port so that in a first position of said flow control means, said fluid inlet and said fluid outlet are closed or slightly opened and said bypass port is opened, so that in a second position of said flow control means, said fluid inlet and said fluid outlet are opened and said bypass port is closed or slightly opened, and so that during an entire transition period from said first position to a second position of said flow control means, both of said opening areas of said fluid inlet and said fluid outlet are gradually increased and said opening area of said bypass port is gradually reduced, wherein the fluid supply source is an engine; and the heat exchanger is a heat exchanger for heating air to be blown into a passenger compartment by using hot water supplied from the engine as the heat source.

2. The valve of claim 1, wherein said flow control means is a needle valve having a rotor rotatably disposed within said valve housing to selectively control said opening areas of said fluid inlet, said fluid outlet and said bypass port.

3. The valve of claim 1, wherein said flow control means is a needle valve having a linearly reciprocating member disposed within said valve housing to selectively control said opening areas of said fluid inlet, said fluid outlet and said bypass port.

4. The valve of claim 1, wherein said flow control means includes a movable member having surface thereon defining control passages connecting said fluid inlet, said fluid outlet and said bypass port.

5. The valve of claim 1, wherein said fluid control means is further for providing fluid flow between said fluid inlet and said bypass port in said first and second positions.

6. The valve of claim 1, wherein said fluid control means is further for selectively controlling opening areas of said fluid inlet, said fluid outlet and said bypass port by providing combinations of opening areas of said fluid inlet, said fluid outlet and said bypass port, each of said combinations corresponding to an intermediate position of said fluid control means between said first and second positions.

7. The valve of claim 6, wherein said fluid inlet opening area and said fluid outlet opening area in said combinations establish a predetermined relationship.

8. The valve of claim 7, wherein:

said fluid inlet opening area is substantially uniform in combinations corresponding to positions of said flow control means which are less than a predetermined distance from said first position;

said fluid inlet opening area increases in combinations corresponding to positions of said flow control means closer to said second position;

said fluid outlet opening area permits fluid flow therethrough when said flow control means is in a position other than said first position; and said fluid outlet opening area increases in combinations corresponding to positions of said flow control means closer to said second position.

9. The valve of claim 8, wherein said fluid inlet opening area and said fluid outlet opening area are at their respective maxima when said flow control means is in said second position.

10. The valve of claim 1, wherein said fluid inlet and said fluid outlet are coaxial.

11. The valve of claim 1, wherein longitudinal axes of said fluid inlet and said bypass port are substantially perpendicular.

12. The valve of claim 1, wherein longitudinal axes of said fluid inlet and said bypass port are substantially parallel.

13. The valve of claim 1, wherein longitudinal axes of said fluid inlet and said bypass port are skew to one another.

14. The valve of claim 1, said flow control means comprising:
   a control passage;
   a first throttle portion disposed between said fluid inlet and said control passage;
   a second throttle portion disposed between said fluid outlet and said control passage; and
   a third throttle portion disposed between said bypass port and said control passage;
   wherein said flow control means is further for, when said fluid inlet, said fluid outlet and said bypass port are in a predetermined position, decreasing flow quantity coefficients through said first and second throttle portions responsive to an increase in flow quantity, and for maintaining said flow quantity coefficients to be substantially constant even when a flow quantity through said third throttle portion increases.

15. The valve of claim 14, wherein said first and second throttle portions have orifice shapes which rapidly throttle fluid flow through said first and second throttle portions, respectively, and said third throttle portion has an orifice shape which more slowly throttles said third throttle portion.

16. The valve of claim 15, further comprising:
   protrusion portions in said first and second throttle portions to rapidly throttle fluid flow through s aid first and second throttle portions, respectively; and
   a slanted portion in said third throttle portion to more slowly throttle fluid flow in said third throttle portion.

17. The valve of claim 15, further comprising:
   protrusion portions disposed on said valve body proximate to said first and second throttle portions to rapidly throttle fluid flow through said first and second throttle portions; and
   a slanted portion disposed on said valve body proximate to said third throttle portions to more slowly throttle fluid flow through said third throttle portion.

18. The valve of claim 14, wherein said predetermined position is a position where an opening area of said bypass port is less than opening areas of said fluid inlet and said fluid outlet.

19. The valve of claim 1, wherein when said flow control means is positioned at said first position, said flow control means filly closes said fluid outlet, and an opening area where said bypass port communicates with said communication path is larger than that of said fluid inlet.

20. The valve of claim 1, wherein said valve housing is formed in a cylindrical shape, and further comprises:
   valve operating means for rotating said flow control means, to which an operating member of said flow control means is connected, two of said fluid inlet, said fluid outlet, and said bypass port being disposed to face a peripheral surface of a cylindrical housing portion of said valve housing with a predetermined gap, the other of said fluid inlet, said fluid outlet, and said bypass port being disposed on one end surface in an axial direction of said cylindrical housing portion of said valve housing, and said operating member being disposed on another end surface in an axial direction of said cylindrical housing portion of said valve housing.

21. The valve of claim 1, wherein said flow control means is further for gradually opening said bypass port when closing said fluid inlet and said fluid outlet to assume said first position, and for gradually closing said bypass port when opening said inlet and said outlet to assume said second position.

22. The flow control valve of claim 1, wherein said control valve is designed such that at least one of said fluid inlet and said fluid outlet is opened with an opening degree smaller than that of said bypass port when said flow control means is in said first position.

23. The flow control valve of claim 1, wherein said control valve is designed such that at least one of said fluid inlet and said fluid outlet is closed when said flow control means is in said first position.

24. The flow control valve of claim 1, wherein said control valve is designed such that during said entire transition period from said first position to said second position, both of said opening areas of said fluid inlet and said fluid outlet are continued to be gradually increased and said opening area of said bypass port is continued to be gradually reduced.

25. A heating apparatus comprising:
   a heated fluid supply source having a fluid entry port and a fluid discharge port;
   a heat exchanger, having a fluid intake port and a fluid outlet port, for exchanging heat between heated fluid from said heated fluid supply source and an environmental gas, a fluid circuit being formed between said heated fluid supply source and said heat exchanger;
   a first bypass path for bypassing fluid in said fluid circuit around said heat exchanger; and
   a flow control valve disposed in said fluid circuit and connected to said first bypass path, said flow control valve including
      a valve housing having a fluid inlet connectable to one of a fluid discharge port of said fluid supply source and said fluid outlet ports, a fluid outlet connectable to one of said fluid intake port of said heat exchanger and said fluid entry port, a communicating path between said fluid inlet and said fluid outlet, a bypass path bypassing said heat exchanger; and
      flow control means, disposed in said valve housing, for selectively controlling opening areas of said fluid inlet, said fluid outlet and said bypass port so that in a first position of said flow control means, said fluid inlet and said fluid outlet are closed or slightly opened and said bypass port is opened, so that in a second position of said flow control means said fluid inlet and said fluid outlet are opened and said bypass port is closed or slightly opened and so that during an entire transition period from said first position to a second position of said flow control means, both of said opening areas of said fluid inlet and said fluid outlet are gradually increased and said opening area of said bypass port is gradually reduced,
   wherein the fluid supply source is an engine; and the heat exchanger is a heat exchanger for heating air to be blown into a passenger compartment by using hot water supplied from the engine as the heat source.

26. The apparatus of claim 25, said first bypass path including a pressure-responsive valve which opens when pressure of heated fluid in said first bypass path reaches a predetermined level.

27. The apparatus of claim 26, wherein said pressure-responsive valve comprises:
   a housing having a heated fluid inlet and a heated fluid outlet, a portion of an inner surface of said housing defining a valve seat;
   a needle valve moving relative to said valve seat responsive to pressure of said heated fluid in said first bypass path; and
   a passage connecting said heated fluid inlet and said heated fluid outlet independent of said needle valve and valve seat.

28. The apparatus of claim 25, further comprising a second bypass path having an upstream end upstream of an upstream end of said first bypass path, said second bypass path being independent of said flow control valve.

29. The apparatus of claim 28, said first and second bypass paths each including a pressure-responsive valve which opens when pressure of heated fluid in its respective bypass path reaches a predetermined level.

30. The apparatus of claim 25, further comprising:
   a pressure-responsive valve in said first bypass path which opens when pressure of heated fluid in said first bypass path reaches a predetermined level; and
   a second, normally open bypass path disposed in said fluid circuit in parallel with said first bypass path.

31. The apparatus of claim 25, wherein:
   said heating apparatus is an automotive heating apparatus installed in an automobile;
   said heated fluid supply source is an engine in said automobile;
   said heated fluid is engine cooling water; and
   said environmental gas is air in a passenger compartment of said vehicle.

32. The apparatus of claim 25, wherein said flow control means is further for gradually opening said bypass port when closing said fluid inlet and said fluid outlet to assume said first position, and for gradually closing said bypass port when opening said inlet and said outlet to assume said second position.

33. The apparatus of claim 25, said flow control means comprising:
   a control passage;
   a first throttle portion disposed between said fluid inlet and said control passage;
   a second throttle portion disposed between said fluid outlet and said control passage; and
   a third throttle portion disposed between said bypass port and said control passage;
   wherein said flow control means is further for, when said fluid inlet, said fluid outlet and said bypass port are in a predetermined position, decreasing flow quantity coefficients through said first and second throttle portions responsive to an increase in flow quantity, and for maintaining said flow quantity coefficients to be substantially constant even when a flow quantity through said third throttle portion increases.

34. The apparatus of claim 33, wherein said first and second throttle portions have orifice shapes which rapidly throttle fluid flow through said first and second throttle portions, respectively, and said third throttle portion has an orifice shape which more slowly throttles said third throttle portion.

35. The apparatus of claim 34, further comprising:
   protrusion portions in said first and second throttle portions to rapidly throttle fluid flow through said first and second throttle portions, respectively; and
   a slanted portion in said third throttle portion to more slowly throttle fluid flow in said third throttle portion.

36. The apparatus of claim 34, further comprising:
   protrusion portions disposed on said valve body proximate to said first and second throttle portions to rapidly throttle fluid flow through said first and second throttle portions; and
   a slanted portion disposed on said valve body proximate to said third throttle portions to more slowly throttle fluid flow through said third throttle portion.

37. The apparatus of claim 36, wherein said predetermined position is a position where an opening area of said bypass port is less than opening areas of said fluid inlet and said fluid outlet.

38. The apparatus of claim 25, wherein when said flow control means is positioned at said first position, said flow control means fully closes said fluid outlet, and an opening area where said bypass port communicates with said communication path is larger than that of said fluid inlet.

39. The apparatus of claim 25, wherein said valve housing is formed in a cylindrical shape, and further comprises:
   valve operating means for rotating said flow control means, to which an operating member of said flow control means is connected, two of said fluid inlet, said fluid outlet, and said bypass port being disposed to face a peripheral surface of a cylindrical housing portion of said valve housing with a predetermined gap, the other of said fluid inlet, said fluid outlet, and said bypass port being disposed on one end surface in an axial direction of said cylindrical housing portion of said valve housing, and said operating member being disposed on another end surface in an axial direction of said cylindrical housing portion of said valve housing.

40. The heating apparatus of claim 25, wherein said control valve is designed such that at least one of said fluid inlet and said fluid outlet is opened with an opening degree smaller than that of said bypass port when said flow control means is in said first position.

41. The heating apparatus of claim 25, wherein said control valve is designed such that at least one of said fluid inlet and said fluid outlet is closed when said flow control means is in said first position.

42. The heating apparatus of claim 25, wherein said control valve is designed such that during said entire transition period from said first position to said second position, both of said opening areas of said fluid inlet and said fluid outlet are continued to be gradually increased and said opening area of said bypass port is continued to be gradually reduced.

* * * * *